(12) United States Patent
Matsubara et al.

(10) Patent No.: US 8,277,360 B2
(45) Date of Patent: Oct. 2, 2012

(54) CONTROL APPARATUS FOR VEHICULAR POWER TRANSMITTING SYSTEM

(75) Inventors: Tooru Matsubara, Toyota (JP); Atsushi Tabata, Okazaki (JP); Taku Akita, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1147 days.

(21) Appl. No.: 12/155,973

(22) Filed: Jun. 12, 2008

(65) Prior Publication Data
US 2008/0318726 A1 Dec. 25, 2008

(30) Foreign Application Priority Data

Jun. 21, 2007 (JP) ................................. 2007-164194

(51) Int. Cl.
*B60W 10/06* (2006.01)
*B60W 10/08* (2006.01)
*B60W 10/10* (2012.01)
*F16H 3/72* (2006.01)
(52) U.S. Cl. .................. 477/3; 477/120; 475/5
(58) Field of Classification Search ............... 477/3, 120
See application file for complete search history.

(56) References Cited

U.S. PATENT DOCUMENTS

| 2007/0099748 A1* | 5/2007 | Matsubara et al. ............... 477/3 |
| 2007/0107956 A1* | 5/2007 | Matsubara et al. .......... 180/65.2 |
| 2008/0146408 A1 | 6/2008 | Tabata et al. |

FOREIGN PATENT DOCUMENTS

| JP | A-11-82716 | 3/1999 |
| JP | A 2005-264762 | 9/2005 |
| JP | A-2007-1465 | 1/2007 |

OTHER PUBLICATIONS

Office Action dated Jan. 10, 2012 in Japanese Patent Application No. 2007-164194 (with partial translation).

* cited by examiner

*Primary Examiner* — Edwin A Young
(74) *Attorney, Agent, or Firm* — Oliff & Berridge, PLC

(57) ABSTRACT

A control apparatus for a vehicular power transmitting system including (a) an electrically controlled differential portion which has a differential mechanism and an electric motor operatively connected to a rotary element of the differential mechanism and which is operable to control a differential state between a rotating speed of its input shaft connected to an engine and a rotating speed of its output shaft by controlling an operating state of the electric motor, and (b) a transmission portion which constitutes a part of a power transmitting path and which functions as an automatic transmission portion, the control apparatus including a shifting control portion configured to set a shifting point of the transmission portion, on the basis of a delay of a response of a change of an operating speed of the engine to a change of a required vehicle drive force to be transmitted through the vehicular power transmitting system.

24 Claims, 10 Drawing Sheets

|  | C1 | C2 | B1 | B2 | B3 | SPEED RATIO | STEPPING RATIO |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | SPREAD 3.36 |
| R |  | O |  |  | O | 3.209 |  |
| N |  |  |  |  |  |  |  |

O ENGAGED

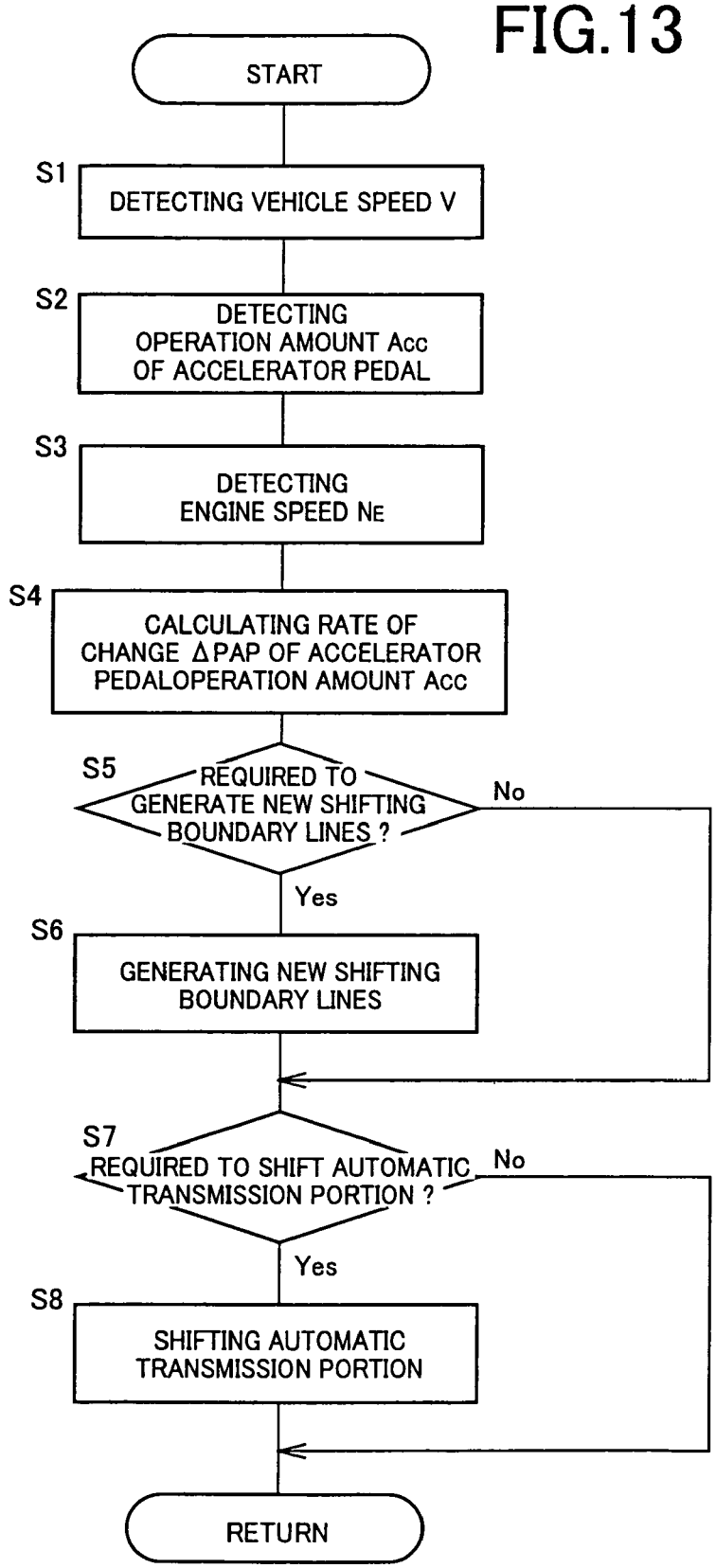

CONTROL APPARATUS FOR VEHICULAR POWER TRANSMITTING SYSTEM

CROSS REFERENCE TO RELATED APPLICATION

The present application claims priority from Japanese Patent Application No. 2007-164194, which was filed on Jun. 21, 2007, the disclosure of which is herein incorporated by reference in its entirety.

BACKGROUND OF THE INVENTION

1. Field of the Invention

The present invention relates in general to a control apparatus for a vehicular power transmitting system, and more particularly to a control apparatus for a vehicular power transmitting system including an electrically controlled differential portion and a transmission portion, which control apparatus permits adequate shifting of the transmission portion so as to provide an optimum speed ratio.

2. Discussion of Prior Art

There is known a vehicular power transmitting system including (a) an electrically controlled differential portion which includes a differential mechanism and an electric motor connected to a rotary element of the differential mechanism and which is operable to control a differential state between rotating speeds of its input and output shafts by controlling an operating state of the electric motor, and (b) a transmission portion which constitutes a part of a power transmitting path and which functions as a step-variable automatic transmission portion. JP-2005-264762A discloses an example of such a vehicular power transmitting system. In the vehicular power transmitting system as disclosed in this publication, there are various combinations of a speed ratio of the electrically controlled differential portion determined by its differential state, and a speed ratio of the automatic transmission portion. In this respect, it is considered possible to improve the fuel economy of the vehicle, by suitably selecting the speed ratio of the electrically controlled differential portion.

For effecting shifting actions of the power transmitting system so as to maximize the fuel economy of a hybrid vehicle, it is theoretically desired to implement shift-up and shift-down actions in running states of the vehicle, which assure high power transmitting efficiency of the vehicle. If the shift-up action and the shift-down action between the same two gear positions are implemented in the same vehicle running condition, that is, if shift-up and shift-down boundary lines defined by a shifting boundary line map are identical with each other, namely, completely overlap each other, so-called "busy shifting actions" tend to take place, giving rise to a problem of deterioration of drivability of the vehicle. For instance, a shift-down action takes place immediately after a shift-up action. In view of this drawback, a suitable hysteresis is provided between the shift-up and shift-down boundary lines for shifting between the same two gear positions. The vehicle condition used for determining whether a shifting action should take place is represented by an opening angle of a throttle valve and a running speed of the vehicle, for example. In this case, the hysteresis is provided such that the shift-down boundary line is located on a high vehicle-drive-force side of the shift-up boundary line, so that the shift-down action is implemented at a lower vehicle running speed or at a larger operation amount of an accelerator pedal (at a larger opening angle of the throttle valve), than when the shift-up action is implemented.

It is noted that the power transmitting efficiency of the vehicle is calculated on the basis of at least the operating speed of a vehicle drive power source such as an engine and the output shaft speed of the power transmitting system. On the other hand, the vehicle condition used for determining the shifting actions is generally represented by the vehicle running speed or any other parameter corresponding or proportional to the vehicle running speed, and the operating amount of the accelerator pedal or any other parameter indicative of the required vehicle drive force. While the vehicle is running in a steady state or in a slowly accelerating or decelerating state, the operating speed of the vehicle drive power source follows the operation amount of the accelerator pedal with a relatively high response, so that the shifting actions of the power transmitting system can be implemented on the basis of the operation amount of the accelerator pedal, with a high degree of the power transmitting efficiency which depends on the operating speed of the vehicle drive power source.

When the accelerator pedal is abruptly depressed, however, the power transmitting system undergoes a shift-down action called "a kick-down". In this case, a response of a change of the operating speed of the vehicle drive power source to an abrupt change of the operation amount of the accelerator pedal is lower than that in the steady running state or slowly accelerating or decelerating state of the vehicle. That is, a rise of the operating speed of the vehicle drive power source is considerably delayed with respect to an increase of the operating amount of the accelerator pedal, so that the operating amount of the accelerator pedal and the operating speed of the vehicle drive power source are not closely related to each other. Therefore, if a shifting action is commanded to take place on the basis of the operating amount of the accelerator pedal related to a target operating speed of the vehicle drive power source, the operating speed of the drive power source at which the shifting action takes place on the basis of the actual operation amount of the accelerator pedal is different from the target value. Accordingly, the shifting action is not implemented in the vehicle running state that permits a high degree of power transmitting efficiency. This problem is not taken into account in the setting of the above-described hysteresis provided for preventing the so-called "busy shifting actions".

SUMMARY OF THE INVENTION

The present invention was made in view of the background art described above. It is therefore an object of this invention to provide a control apparatus for a vehicular power transmitting system, which control apparatus is configured to change the speed ratio of the vehicular power transmitting system while taking account of a delay of a change of an engine speed with respect to a change of a required vehicle drive force as represented by an operation amount of an accelerator pedal.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular power transmitting system including (a) an electrically controlled differential portion which has a differential mechanism and an electric motor operatively connected to a rotary element of the differential mechanism and which is operable to control a differential state between a rotating speed of its input shaft connected to an engine and a rotating speed of its output shaft by controlling an operating state of the electric motor, and (b) a transmission portion which constitutes a part of a power transmitting path and which functions as a step-variable automatic transmission portion, the control apparatus comprising:

a step-variable shifting control portion configured to set a shifting point of the transmission portion, on the basis of a delay of a response of a change of an operating speed of the engine to a change of a required vehicle drive force to be transmitted through the vehicular power transmitting system.

In the control apparatus of the above-described mode (1) according to a first aspect of the present invention, the shifting point of the transmission portion is set on the basis of the response delay of the change of the operating speed of the engine to the change of the required vehicle drive force, so that shifting actions of the transmission portion are adequately implemented even for a transient period during which the actual engine speed is changed to a target value corresponding to the changed required vehicle drive force. Accordingly, the present control apparatus effectively reduces a risk of reduction of the power transmitting efficiency of the vehicular power transmitting system during the shifting actions of the transmission portion.

(2) The control apparatus according to the above-described mode (1), wherein the shifting point is a shift-down point at which the transmission portion is shifted down.

In the above-described mode (2) of the invention, a shift-down action so-called "kick-down" of the transmission portion is adequately implemented even for the transient period during which the actual engine speed is changed to the target value corresponding to a rapidly changed value of the required vehicle drive force in the form of an operation amount of an accelerator pedal, as a result of abrupt depression of the accelerator pedal, for example. Accordingly, the present control apparatus permits effective reduction of the risk of reduction of the power transmitting efficiency of the vehicular power transmitting system during the shift-down actions of the transmission portion.

(3) The control apparatus according to the above-described mode (1) or (2), wherein the step-variable shifting control portion sets the shifting point of the transmission portion such that an operating speed of the electric motor does not exceed a predetermined upper limit.

In the above-described mode (3) of this invention, the transmission portion is shifted so as prevent a rise of the operating speed of the electric motor beyond the predetermined upper limit.

(4) The control apparatus according to any one of the above-described modes (1)-(3), wherein the step-variable shifting control portion sets the shifting point of the transmission portion such that a value of the required vehicle drive force at which the transmission portion is shifted at a given running speed of a vehicle provided with the vehicular power transmitting system increases with an increase of a rate of change of the required vehicle drive force.

In the above-described mode (4), the shifting point of the transmission portion is set by taking account of the response delay of the change of the engine speed to the change of the required vehicle drive force, which response delay is increased as the rate of change of the required vehicle drive force is increased. Accordingly, the risk of reduction of the power transmitting efficiency of the vehicular power transmitting system is effectively reduced even when the rate of change of the required vehicle drive force is relatively high.

(5) The control apparatus according to any one of the above-described modes (1)-(4), wherein the step-variable shifting control portion sets the shifting point of the transmission portion such that a value of the required vehicle drive force at which the transmission portion is shifted at a given running speed of a vehicle provided with the vehicular power transmitting system increases with a decrease of an operating speed of the engine.

In the above-described mode (5) of the present invention, the shifting point of the transmission portion is set by taking account of the response delay of the change of the engine speed to the change of the required vehicle drive force, which response delay is increased as the operating speed of the engine is lowered. Accordingly, the risk of reduction of the power transmitting efficiency of the vehicular power transmitting system is effectively reduced even when the operating speed of the engine is relatively low.

(6) The control apparatus according to any one of the above-described modes (1)-(5), wherein the step-variable shifting control portion sets the shifting point of the transmission portion such that a value of the required vehicle drive force at which the transmission portion is shifted at a given running speed of a vehicle provided with the vehicular power transmitting system increases with a decrease of an output shaft speed of the vehicular power transmitting system.

In the above-described mode (6), the shifting point of the transmission portion is set by taking account of the response delay of the change of the engine speed to the change of the required vehicle drive force, which response delay is increased as the output shaft speed of the vehicular power transmitting system is lowered. Accordingly, the risk of reduction of the power transmitting efficiency of the vehicular power transmitting system is effectively reduced even when the output shaft speed of the vehicular power transmitting system is relatively low.

(7) The control apparatus according to any one of the above described modes (1)-(6), wherein the electrically controlled differential portion functions as a continuously-variable transmission portion while the operating state of the electric motor is controlled.

In the above-described mode (7) of the invention, the electrically controlled differential portion and the transmission portion cooperate to constitute a continuously variable transmission, which is operable to smoothly change the vehicle drive torque. The electrically controlled differential portion is operable as a step-variable transmission portion the speed ratio of which is variable in steps, as well as an electrically controlled continuously-variable transmission portion the speed ratio of which is continuously variable.

(8) The control apparatus according to any one of the above-described modes (1)-(7), wherein the transmission portion is disposed between the electrically controlled differential portion and an output shaft of the vehicular power transmission system.

In the above-described mode (8) of the present invention, the electrically controlled differential portion and the transmission portion are disposed in series with each other, so that the vehicular power transmitting system is made compact in construction.

(9) A control apparatus for a vehicular power transmitting system including (a) an electrically controlled differential portion which has a differential mechanism operatively connected to an engine and an electric motor operatively connected to a rotary element of the differential mechanism and a differential state of which is controllable by controlling an operating state of the electric motor, and (b) a transmission portion which constitutes a part of a power transmitting path and which functions as a step-variable automatic transmission portion, the control apparatus comprising:

a shifting control portion configured to set a switching point of an operating mode of the vehicular power transmitting system, on the basis of a delay of a response of a change of an operating speed of the engine to a change of a required vehicle drive force to be transmitted through the vehicular power transmitting system.

In the control apparatus of the above-described mode (9) according to a second aspect of this invention, the switching point at which the operating mode which determines the operating state of the vehicular power transmitting system is set on the basis of the response delay of the change of the operating speed of the engine to the change of the required vehicle drive force, so that the operating mode of the vehicular power transmitting system is adequately switched even for a transient period during which the actual engine speed is changed to a target value corresponding to the changed required vehicle drive force. Accordingly, the present control apparatus effectively reduces a risk of reduction of the power transmitting efficiency of the vehicular power transmitting system during switching of the operating mode.

(10) The control apparatus according to the above-described mode (9), wherein the switching point is a shift-down switching point at which the vehicular power transmitting system is shifted down.

In the above-described mode (10), the switching point is the shift-down switching point at which the operating mode is changed from a mode suitable for a high-speed running of a vehicle to a mode suitable for low-speed running of the vehicle. Accordingly, a change of the operating mode so-called "kick-down" of the vehicular power transmitting system is adequately implemented even for the transient period during which the actual engine speed is changed to the target value corresponding to a rapidly changed value of the required vehicle drive force in the form of an operation amount of an accelerator pedal, as a result of abrupt depression of the accelerator pedal, for example. Accordingly, the present control apparatus permits effective reduction of the risk of reduction of the power transmitting efficiency of the vehicular power transmitting system during switching of the operating mode.

(11) The control apparatus according to the above-described mode (9) or (10), wherein the shifting control portion sets the switching point of the operating mode of the vehicular power transmitting system such that an operating speed of the electric motor does not exceed a predetermined upper limit.

In the above-described mode (11), the operating mode of the vehicular power transmitting system is switched so as prevent a rise of the operating speed of the electric motor beyond the predetermined upper limit.

(12) The control apparatus according to any one of the above-described modes (9-(11), wherein the shifting control portion sets the switching point of the operating mode of the vehicular power transmitting system such that a value of the required vehicle drive force at which the operating mode is switched at a given running speed of a vehicle provided with the vehicular power transmitting system increases with an increase of a rate of change of the required vehicle drive force.

In the above-described mode (12), the switching point of the operating mode of the vehicular power transmitting system is set by taking account of the response delay of the change of the engine speed to the change of the required vehicle drive force, which response delay is increased as the rate of change of the required vehicle drive force is increased. Accordingly, the risk of reduction of the power transmitting efficiency of the vehicular power transmitting system is effectively reduced even when the rate of change of the required vehicle drive force is relatively high.

(13) The control apparatus according to any one of the above-described modes (9)-(12), wherein the shifting control portion sets the switching point of the operating mode of the vehicular power transmitting system such that a value of the required vehicle drive force at which the operating mode is switched at a given running speed of a vehicle provided with the vehicular power transmitting system increases with a decrease of an operating speed of the engine.

In the above-described mode (13), the switching point of the operating mode of the vehicular power transmitting system is set by taking account of the response delay of the change of the engine speed to the change of the required vehicle drive force, which response delay is increased as the operating speed of the engine is lowered. Accordingly, the risk of reduction of the power transmitting efficiency of the vehicular power transmitting system is effectively reduced even when the operating speed of the engine is relatively low.

(14) The control apparatus according to any one of the above-described modes (9)-(13), wherein the shifting control portion sets the switching point of the operating mode of the vehicular power transmitting system such that a value of the required vehicle drive force at which the operating mode is switched at a given running speed of a vehicle provided with the vehicular power transmitting system increases with a decrease of an output shaft speed of the vehicular power transmitting system.

In the above-described mode (14), the switching point of the operating mode of the vehicular power transmitting system is set by taking account of the response delay of the change of the engine speed to the change of the required vehicle drive force, which response delay is increased as the output shaft speed of the vehicular power transmitting system is lowered. Accordingly, the risk of reduction of the power transmitting efficiency of the vehicular power transmitting system is effectively reduced even when the output shaft speed of the vehicular power transmitting system is relatively low.

(15) The control apparatus according to any one of the above-described modes (9)-(14), wherein the electrically controlled differential portion functions as a continuously variable transmission while the operating state of the electric motor is controlled.

The above-described mode (15) has the same advantage as described above with the above-described mode (7).

(16) The control apparatus according to any one of the above-described modes (9)-(15), wherein the transmission portion is disposed between the electrically controlled differential portion and an output shaft of the vehicular power transmission system.

The above-described mode (16) has the same advantage as described above with respect to the above-described mode (8).

BRIEF DESCRIPTION OF THE DRAWINGS

The above and other objects, features, advantages, and technical and industrial significance of this invention will be better understood by reading the following detailed description of a preferred embodiment of the present invention, when considered in connection with the accompanying drawings, in which:

FIG. 13 is a flow chart illustrating a control routine executed by the electronic control device of FIG. 4, to change shifting boundary lines and shifting the automatic transmission portion according to the changed shifting boundary lines, when a change of the engine speed is delayed with respect to a change of an operation amount of an accelerator pedal.

DETAILED DESCRIPTION OF THE PREFERRED EMBODIMENT

Figures 1, 2:
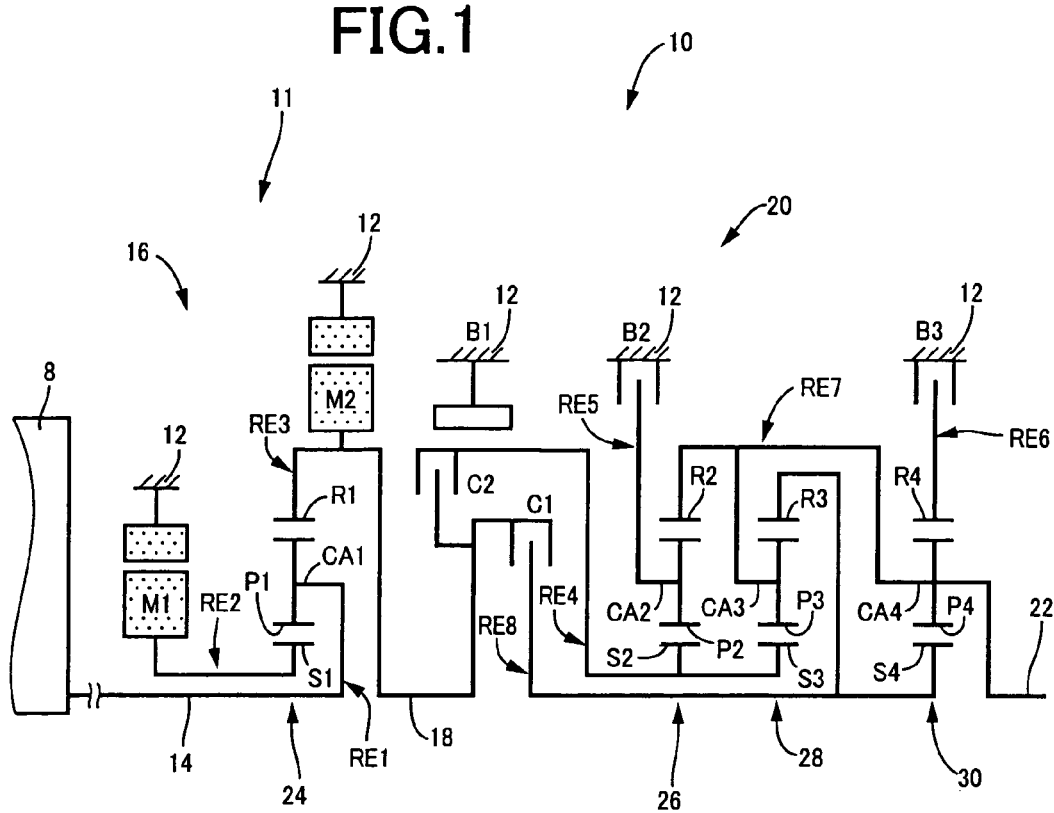
FIG. 1 is a schematic view showing an arrangement of a transmission mechanism constituting a part of a power transmitting system of a hybrid vehicle, which is controlled by a control apparatus constructed according to one embodiment of this invention.
FIG. 2 is a table indicating shifting actions of an automatic transmission portion provided in the power transmitting system of FIG. 1, in relation to different combinations of operating states of hydraulically operated frictional coupling devices to effect the respective shifting actions.
Figure 7:
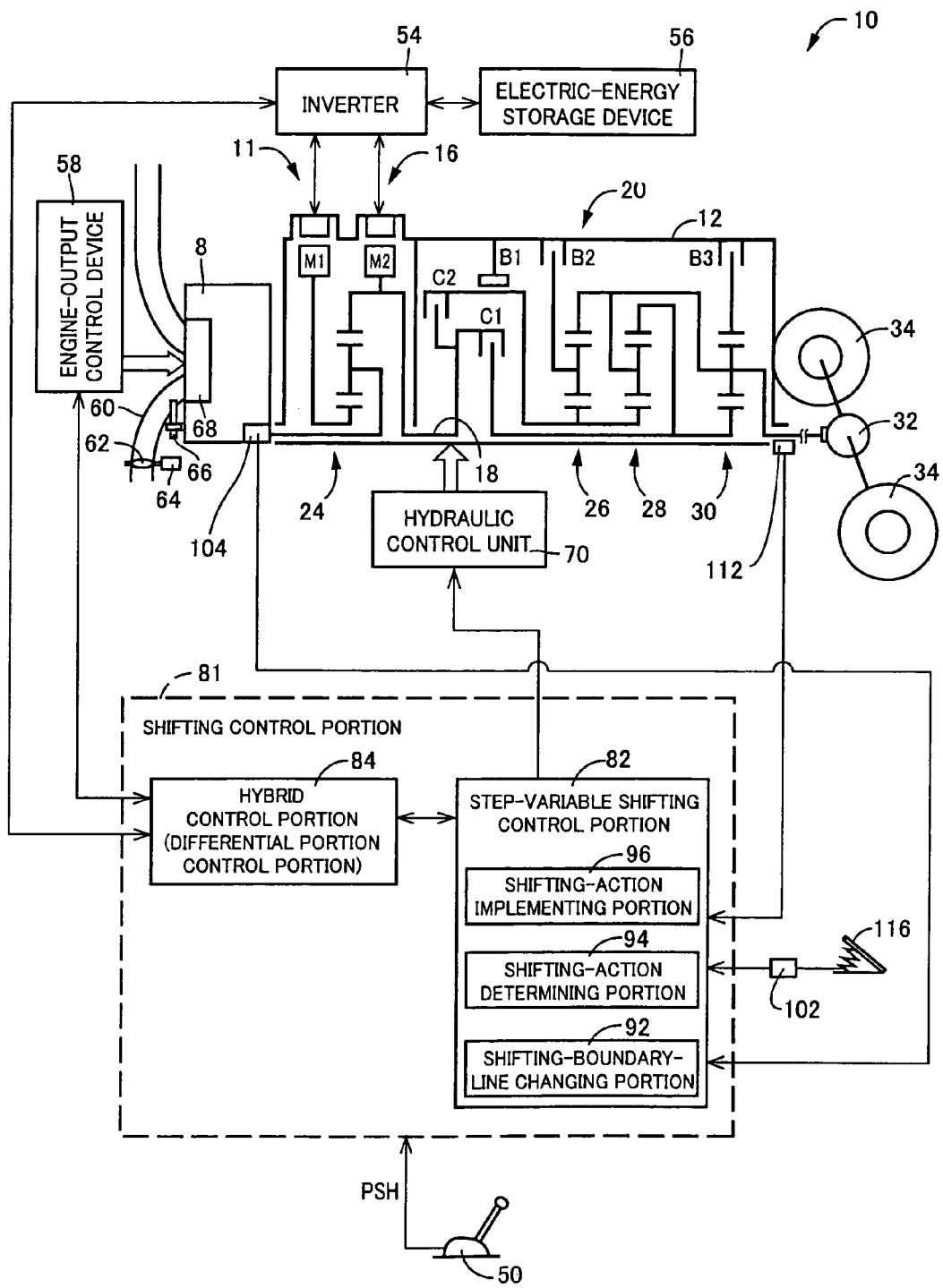
FIG. 7 is a functional block diagram illustrating major control functions of the electronic control device of FIG. 4.

Referring first to the schematic view of FIG. 1, there is shown a transmission mechanism 10 constituting a part of a power transmitting system for a hybrid vehicle, which power transmitting system is controlled by a control apparatus constructed according to a first embodiment of this invention. As shown in FIG. 1, the transmission mechanism 10 includes: a input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force. It will be understood that the differential portion 11 functions as an electrically controlled differential portion.

The power distributing mechanism 16 includes, as a major component, a first planetary gear set 24 of a single pinion type having a gear ratio $\rho 1$ of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio $\gamma 0$ (rotating speed $N_{IN}$ of the input shaft 14/rotating speed $N_{18}$ of the power transmitting member 18) of the differential portion 11 is continuously changed from a minimum value $\gamma 0$min to a maximum value $\gamma 0$max, that is, in the continuously-variable shifting state in which the differential portion 11 functions as an electrically controlled differential portion the speed ratio $\gamma 0$ of which is continuously variable from the minimum value $\gamma 0$min to the maximum value $\gamma 0$max.

The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state. It will be understood that the first and second clutches C1, C2 function as a switching portion operable to switch the power transmitting path between the differential portion 11 and the drive wheels 34, between the power transmitting state and the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios $\gamma$ (rotating speed $N_{18}$ of the power transmitting member 18/rotating speed $N_{OUT}$ of the output shaft 22) which change as geometric series. As indicated in the table of FIG. 2, the first gear position having the highest speed ratio $\gamma 1$ of about 3.357, for example, is established by engaging actions of the first clutch C1 and third brake B3, and the second gear position having the speed ratio $\gamma 2$ of about 2.180, for example, which is lower than the speed ratio $\gamma 1$, is established by engaging actions of the first clutch C1 and second brake B2. Further, the third gear position having the speed ratio $\gamma 3$ of about 1.424, for example, which is lower than the speed ratio $\gamma 2$, is established by engaging actions of the first clutch C1 and first brake B1, and the fourth gear position having the speed ratio $\gamma 4$ of about 1.000, for example, which is lower than the speed ratio $\gamma 3$, is established by engaging actions of the first clutch C1 and second clutch C2. The reverse gear position having the speed ratio $\gamma R$ of about 3.209, for example, which is intermediate between the speed ratios $\gamma 1$ and $\gamma 2$, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
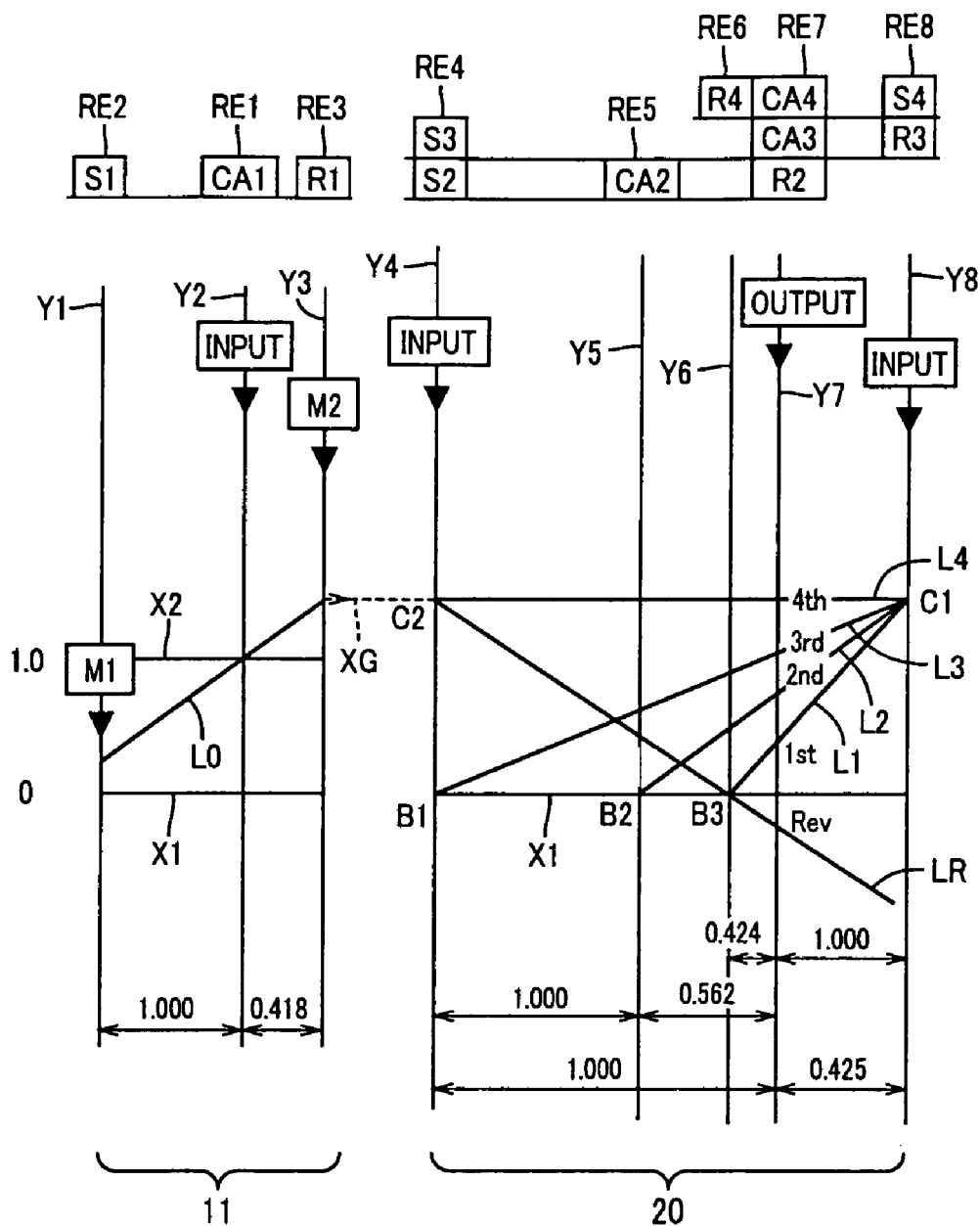
FIG. 3 is a collinear chart indicating relative rotating speeds of rotary elements of an electrically controlled differential portion and the automatic transmission portion of the power transmitting system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed $N_E$ is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
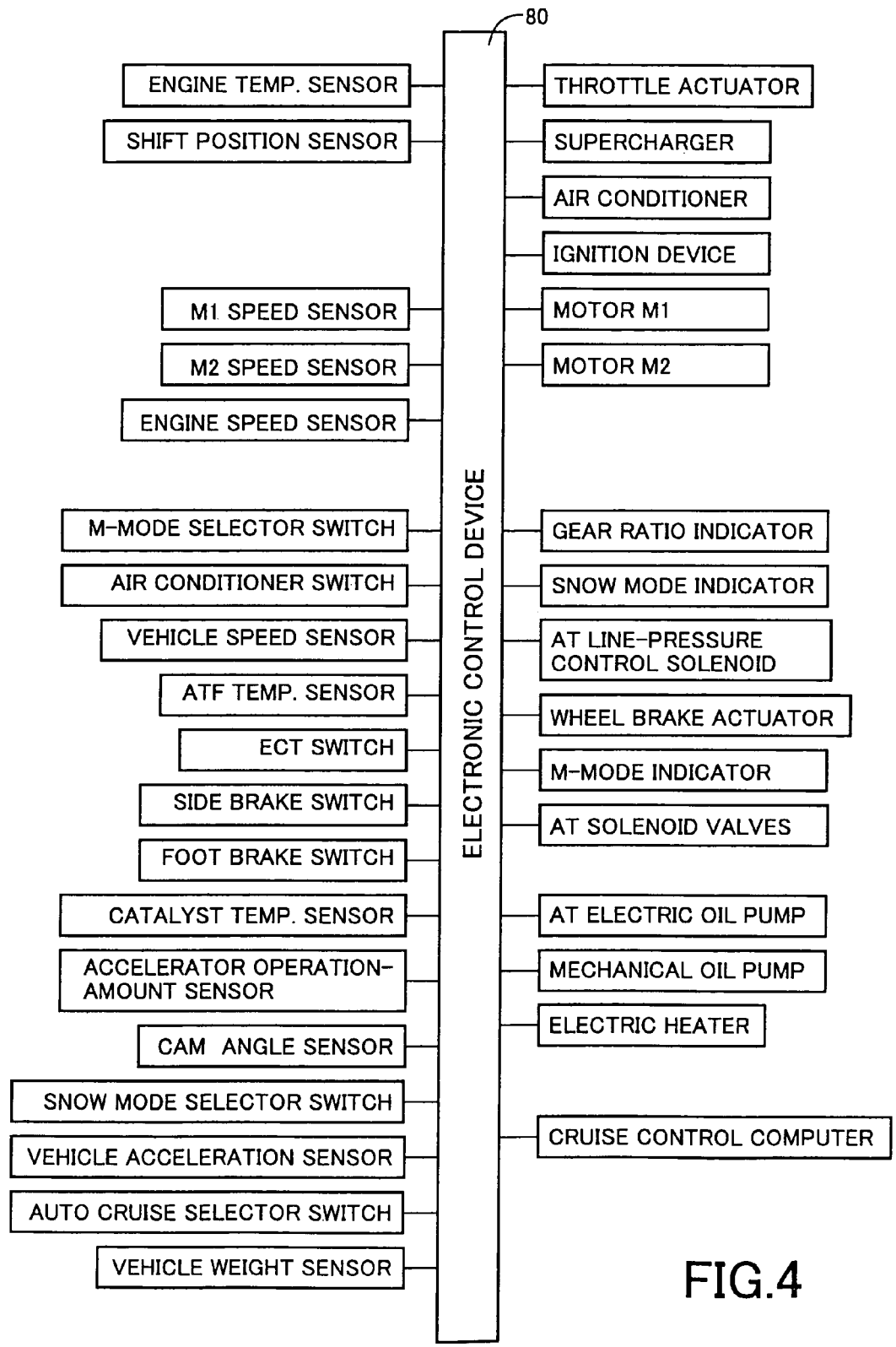
FIG. 4 is a view indicating input and output signals of an electronic control device serving as the control apparatus according to the embodiment of this invention to control the power transmitting system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a manually operable shifting member in the form of a shift lever 52 (shown in FIG. 6); a signal indicative of the number of operations of the shift lever 52 from a manual forward-drive shifting position M (described below); a signal indicative of the operating speed $N_E$ of the engine 8 detected by an engine speed sensor 104 (shown in FIG. 7); a signal indicative of an M mode (manual shifting mode); a signal indicative of an operated state of an air conditioner; a signal indicative of a vehicle speed V which is detected by a vehicle speed sensor 112 (shown in FIG. 7) and which corresponds to the rotating speed $N_{OUT}$ of the output shaft 22 (hereinafter referred to as "output shaft speed"); a signal indicative of a temperature $T_{ATF}$ of a working fluid or oil of the automatic transmission portion 20; a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal 116 (shown in FIG. 7); a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); a signal indicative of a rotating speed $N_{M2}$ of the second electric motor M2 (hereinafter referred to as "second electric motor speed $N_{M2}$, where appropriate); and a signal indicative of an amount of electric energy SOC stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening θTH of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
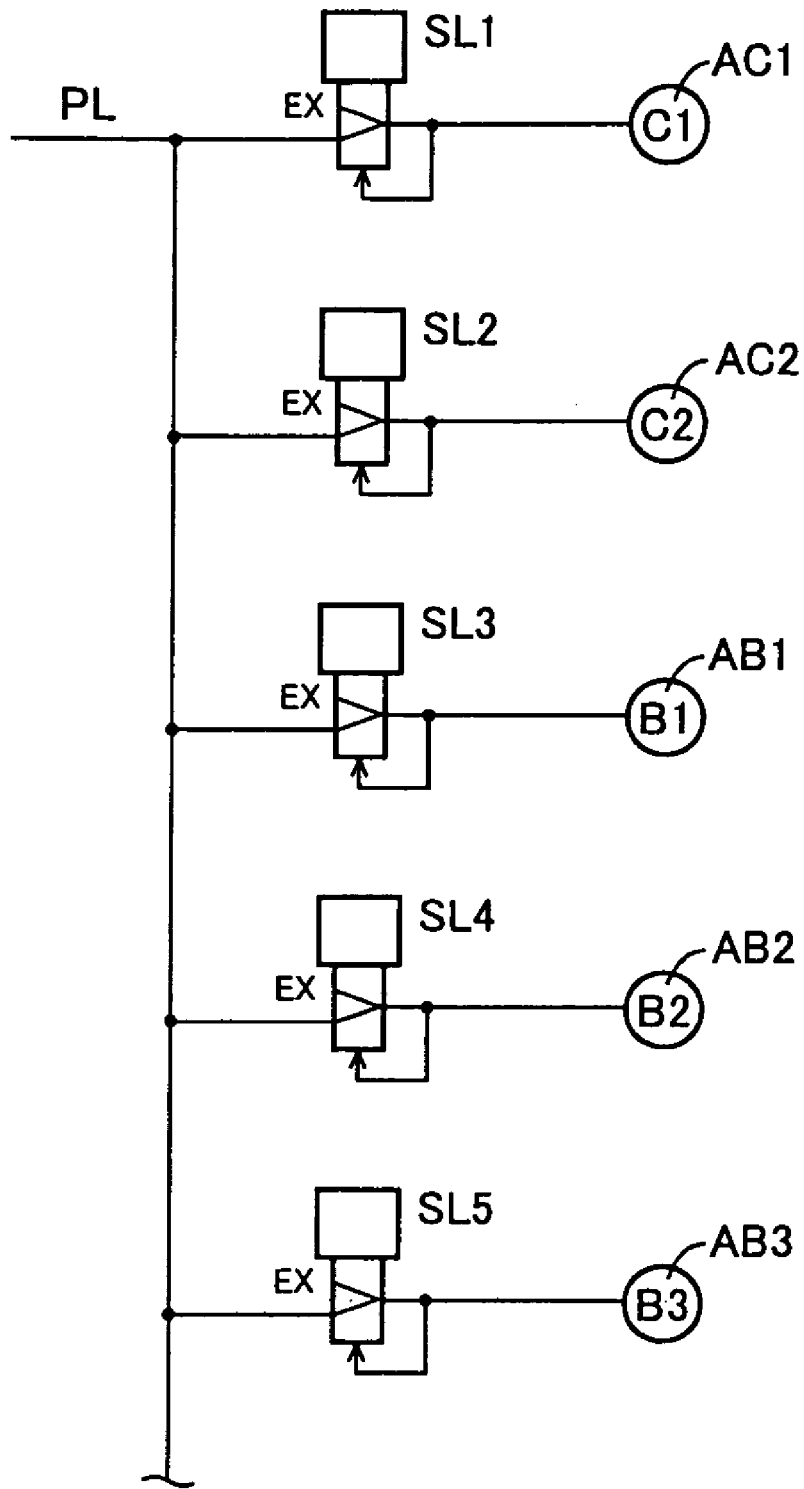
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by an operation amount $A_{CC}$ of the accelerator pedal 116 or the opening angle θTH of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of one of the coupling devices (C, B) and a releasing action of another of the coupling devices, which take place concurrently.

Figure 6:
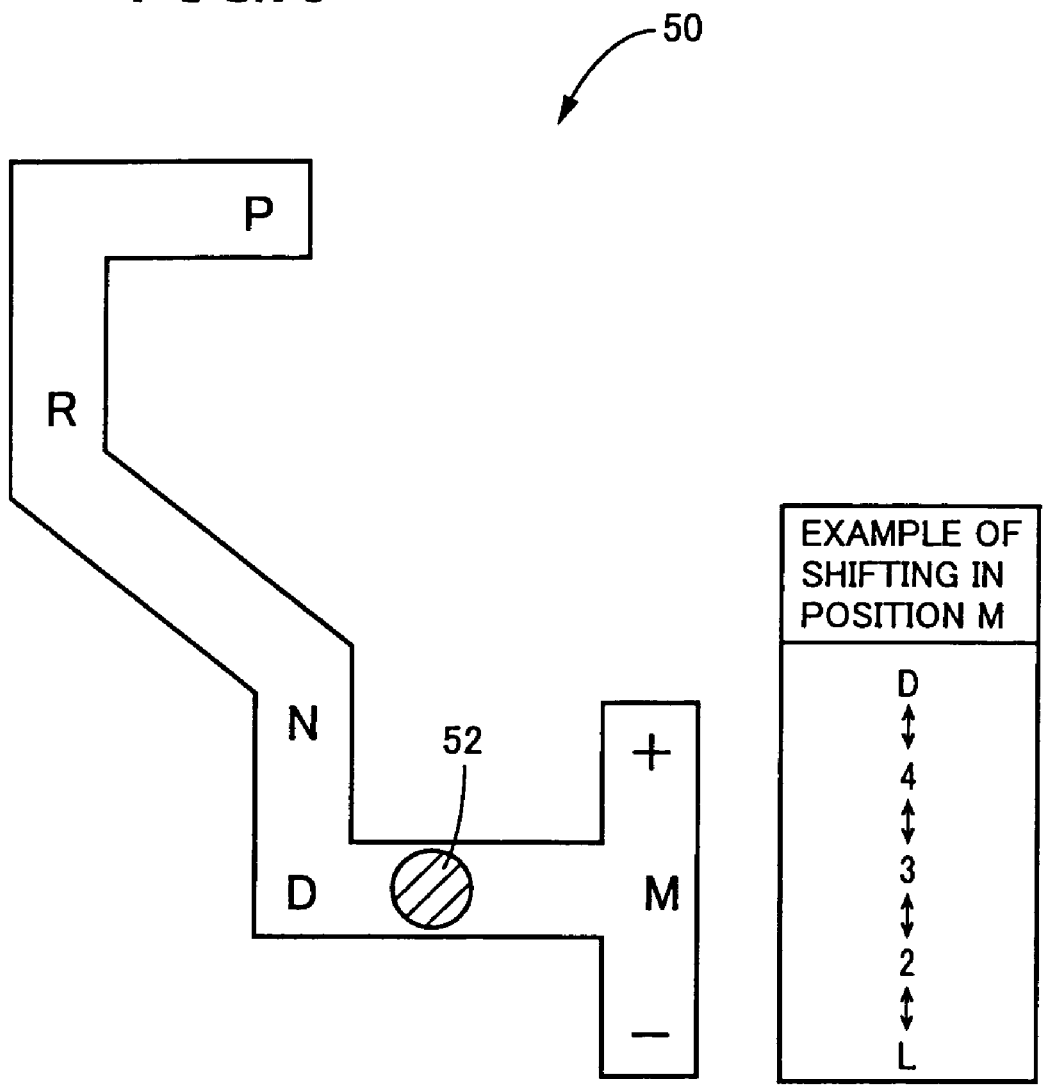
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the transmission mechanism 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position D for establishing an automatic shifting mode; and the above-indicated manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 52 from the neutral position N to the automatic forward-drive position D causes at least the first clutch C1 to be engaged for switching the power transmitting path in the automatic transmission portion 20 from the power cut-off state to the power transmitting state. A manual operation of the shift lever 52 from the rear-drive position R to the parking position P or neutral position N cause the second clutch C2 to be released for switching the power transmitting path in the automatic transmission portion 20 from the power transmitting state to the power cut-off state. A manual operation of the shift lever 52 from the automatic forward-drive position D to the neutral position N causes the first clutch C1 and the second clutch C2 to be released for switching the power transmitting path from the power transmitting state to the power cut-off state.

The operating modes of the power transmitting system correspond to selectable different operating states of the transmission mechanism 10, which correspond to operating states of the automatic transmission portion 20 constituting a part of the transmitting path, namely, correspond to the forward-drive gear positions selectable with the shift lever 52 placed in the automatic or manual forward-drive position D, M, the reverse-drive position selected with the shift lever 52 placed in the reverse-drive position R, and the neutral and parking positions N, P selected with the shift lever 52 placed in the respective neutral and parking positions N, P. The operating modes are selectable by the shifting actions of the automatic transmission portion 20, or by a switching operation between the power transmitting state and the power cut-off state of the power transmitting path. Points at which the operating mode is changed from one mode to another correspond to shifting points defined by shift-up and shift-down boundary lines which will be described by reference to FIG. 8.

Referring to the functional block diagram of FIG. 7, the electronic control device 80 is provided with a shifting control portion 81 including a step-variable shifting control portion 82 and a hybrid control portion 84. The step-variable shifting control portion 82 includes a shifting-boundary-line changing portion 92, a shifting-action determining portion, and a shifting-action implementing portion 96. The shifting-action determining portion 94 is configured to determine whether a shifting action of the automatic transmission portion 20 should take place, that is, to determine the gear position to which the automatic transmission portion 20 should be shifted. This determination is made on the basis of a condition of the vehicle as represented by the actual output shaft speed $N_{OUT}$ of the transmission mechanism 10 and the actual operation amount $A_{CC}$ of the accelerator pedal 116, and according to a stored shifting boundary line map (shifting control map or relation) which represents the shift-up boundary lines indicated by solid lines in FIG. 8 and the shift-down boundary lines indicated by one-dot chain lines in FIG. 8. The shifting-action implementing portion 96 controls the automatic transmission portion 20 to perform a shifting action to establish the gear position determined by the shifting-action determining portion 94. The operation amount $A_{CC}$ of the accelerator pedal 116 is an amount of depression of the accelerator pedal 116 which is detected by an accelerator operation-amount sensor 102. It will be understood that the vehicle speed V is determined by the output shaft speed $N_{OUT}$, a speed reduction ratio of the final speed reduction gear device 32 and a diameter of the drive wheels 34.

For establishing the gear position of the automatic transmission portion 20 determined by the shifting-action determining portion 94, the shifting-action implementing portion 96 generates a shifting command (hydraulic control command) to be applied to the hydraulic control unit 70, to engage and release the appropriate two hydraulically operated frictional coupling devices (C1, C2, B1, B2, B3), according to the table of FIG. 2. Described in detail, the shifting-action implementing portion 96 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

Figure 9:
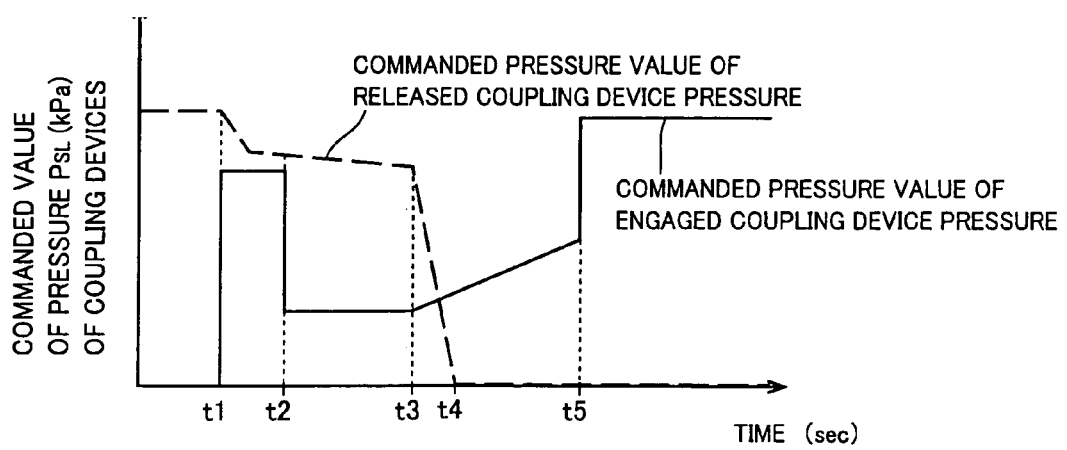
FIG. 9 is a time chart indicating changes of commanded hydraulic pressure values of two frictional coupling devices to be engaged and released to effect a shifting action of the automatic transmission portion.
Figure 10:
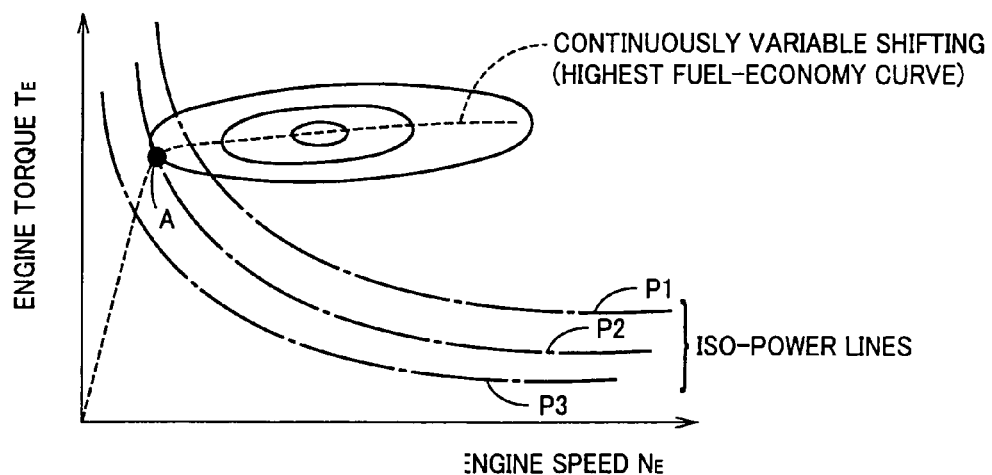
FIG. 10 is a view illustrating an example of a fuel consumption map defining a highest-fuel-economy curve of an engine (indicated by broken line)

FIG. 9 is a time chart indicating changes of commanded values of hydraulic pressures $P_{SL}$ of the two frictional coupling devices to be engaged and released to effect a clutch-to-clutch shifting action of the automatic transmission portion 20. In the time chart of FIG. 9, the time t (sec) is taken along the horizontal axis while the commanded value of the hydraulic pressure $P_{SL}$ is taken along the vertical axis. Solid line indicates the commanded value of the hydraulic pressure $P_{SL}$ of the frictional coupling device to be engaged for the clutch-to-clutch shifting action, while broken line indicates the commanded value of the hydraulic pressure $P_{SL}$ of the frictional coupling device to be released for the clutch-to-clutch shifting action.

The shifting-action determining portion 94 commands the hydraulic control unit 70 to apply the hydraulic pressure $P_{SL}$ to the frictional coupling device (hereinafter referred to as "engaged coupling device") to be engaged for the determined shifting action. As indicated by the solid line, a supply of the hydraulic pressure $P_{SL}$ to the engaged coupling device is initiated at a point of time t1. During a time period from the point of time t1 to a point of time t2, the hydraulic pressure $P_{SL}$ of the engaged coupling device is held at a relatively high value for a rapid movement of a piston of that coupling device to rapidly eliminate a back clearance of the piston, namely, for performing a so-called "fast fill" of a cylinder of the engaged coupling device. At the point of time t2, the hydraulic pressure $P_{SL}$ is lowered to a waiting-time pressure $P_W$ and held at this waiting-time value $P_W$ for a predetermined waiting time ending at a point of time t3. This waiting time is provided to prevent a shock which would take place if the hydraulic pressure $P_{SL}$ was held at the relatively high value for the fast fill for a longer time during which the engaging action of the engaged coupling device would be initiated. At the point of time t3, the engaging action is initiated, and the commanded value of the hydraulic pressure $P_{SL}$ is gradually raised up to a predetermined value, which is reached at a point of time t5. At the point of time t5, the hydraulic pressure $P_{SL}$ is rapidly raised to a value for full engagement of the coupling device in question. As indicated by the broken line in FIG. 9, the hydraulic pressure $P_{SL}$ of the frictional coupling device to be released (hereinafter referred to as "released coupling device") for the determined shifting action is gradually lowered for a time period from the point of time t1 to the point of time t3, for preparation for the releasing action of the released coupling device. At the point of time t3, a rapid drop of the hydraulic pressure $P_{SL}$ is initiated. The hydraulic pressure $P_{SL}$ is eventually lowered to a value for the full releasing of the released coupling device at a point of time t4. Thus, the clutch-to-clutch shifting action is implemented by the engaging and releasing actions of the two frictional coupling devices.

Referring back to the functional block diagram of FIG. 7, the hybrid control portion 84 functions as a differential portion control portion, and controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Thus, the overall speed ratio γT of the transmission mechanism 10 is determined by the speed ratio γ0 of the differential portion controlled by the hybrid control portion 84, and the speed ratio γ of the automatic transmission portion 20 controlled by the step-variable transmission portion 82. In this respect, the step-variable shifting control portion 82 and the hybrid control portion 84 are considered to constitute the shifting control portion 81, which is operable to control the overall speed ratio γT of the transmission mechanism 10 within a range corresponding to the shift position $P_{SH}$ represented by the output signal of the manually operable shifting device 50 as a result of an operation of the shift lever 52 by the vehicle operator.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio $\gamma T$ of the transmission mechanism 10, so that the engine 8 is operated according to a stored highest-fuel-economy curve (fuel-economy map or relation) indicated by broken line in FIG. 9. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio $\gamma 0$ of the differential portion 11, so as to obtain the target value of the overall speed ratio $\gamma T$, so that the overall speed ratio $\gamma T$ can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

When a shifting action of the automatic transmission portion 20 is performed under the control of the step-variable shifting control portion 82, the overall speed ratio $\gamma T$ of the transmission mechanism 10 is changed in steps due to a stepping change of the speed ratio of the automatic transmission portion 20 during its shifting action. A change of the overall speed ratio $\gamma T$ in steps rather than continuously, namely, a stepping change of the overall speed ratio $\gamma T$ permits a more rapid change of the overall speed ratio $\gamma T$, but on the other hand may cause a shifting shock of the transmission mechanism 10, or a failure to control the engine speed $N_E$ following the highest fuel-economy curve and consequent reduction of the fuel economy.

In view of the potential drawback indicated above, the hybrid control portion 84 is configured to control the speed ratio of the differential portion 11 in synchronization with a shifting action of the automatic transmission portion 20, such that the speed ratio of the differential portion 11 changes in a direction opposite to a direction of the stepping change of the speed ratio of the automatic transmission portion 20, for thereby reducing the stepping change of the overall speed ratio $\gamma T$. In other words, the hybrid control portion 84 is configured to implement a shifting control of the differential portion 11 in synchronization with the shifting action of the automatic transmission portion 20, such that the overall speed ratio $\gamma T$ of the transmission mechanism 10 changes continuously during the shifting action of the automatic transmission portion 20. For instance, the hybrid control portion 84 implements the shifting control of the differential portion 11 in synchronization with the shifting action of the automatic transmission portion 20, such that the speed ratio of the differential portion 11 changes in steps in the direction opposite to the direction of the stepping change of the speed ratio of the automatic transmission portion 20, by an amount equal to an amount of the stepping change of the automatic transmission portion 20 for thereby preventing a transient stepping change of the overall speed ratio $\gamma T$ of the transmission mechanism 10 during the shifting action of the automatic transmission portion 20.

In other words, the hybrid control portion 84 is configured to control the speed ratio $\gamma 0$ of the differential portion 11 such that the operating state of the engine 8 does not change during a shifting action of the automatic transmission portion 20, irrespective of a stepping change of the automatic transmission portion 20 during its shifting action. FIG. 9 indicates iso-power curves P1, P2 and P3 of the engine 8, by way of example. In FIG. 9, a point A represents the operating state of the engine 8 as represented by the engine speed $N_E$ and engine torque $T_E$, at which the required engine output P2 is obtained with the highest fuel economy. The hybrid control portion 84 is arranged to implement a so-called "iso-power shifting control" of the differential portion 11 such that the operating state of the engine 8 as represented by the point A for example does not change during the shifting action of the automatic transmission portion 20, or follows the highest fuel-economy curve and the iso-power curve. Described more specifically, the hybrid control portion 84 controls the throttle actuator 64 so as to keep the engine torque $T_E$ substantially constant during the shifting action of the automatic transmission portion 20, and controls the first electric motor speed $N_{M1}$ in a direction opposite to a direction of change of the second electric motor speed $N_{M2}$ due to the shifting action, for thereby keeping the engine speed $N_E$ substantially constant.

The hybrid control portion 84 is further arranged to hold the engine speed $N_E$ substantially constant or at a desired value, by controlling the first electric motor speed $N_{M1}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant. To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle θTH of the electronic throttle valve 62 such that the opening angle θTH increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state.

Figure 8:
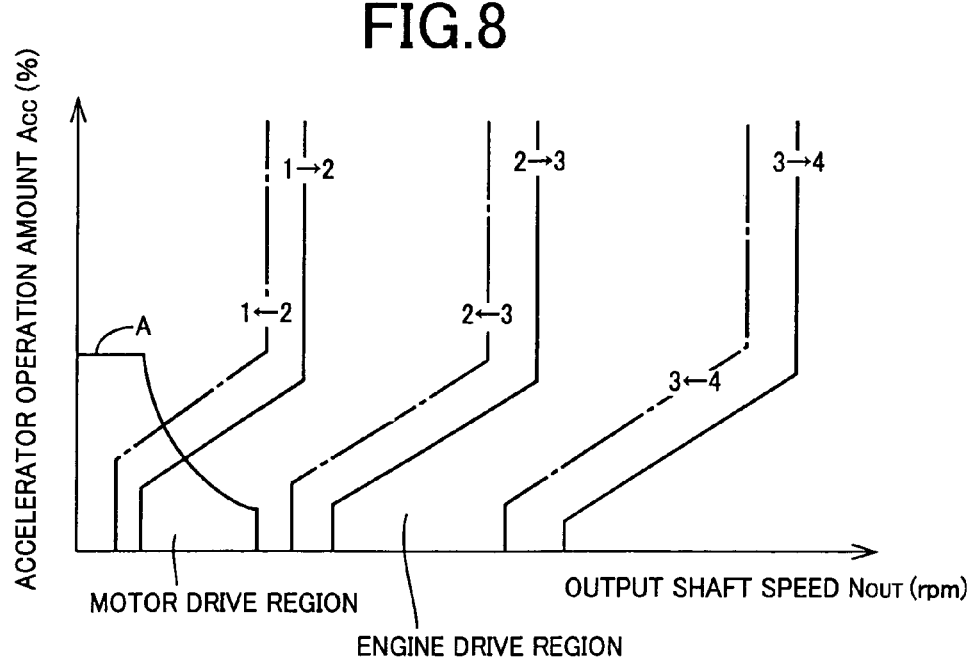
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

For example, the hybrid control portion 84 is configured to determine whether the vehicle running condition represented by the actual output shaft speed $N_{OUT}$ and the required output torque $T_{OUT}$ of the automatic transmission portion 20 represented by the actual accelerator pedal operation amount $A_{CC}$ is in a motor-drive region in which the second electric motor M2 is used as the vehicle drive power source, or in an engine-drive region in which the engine 8 is used as the vehicle drive power source. This determination is made on the basis of the actual vehicle output shaft speed $N_{OUT}$ and the actual accelerator pedal operation amount $A_{CC}$, and according to a predetermined drive-power-source switching boundary line map, which is stored in a memory together with the shift-up boundary lines and shift-down boundary lines that are indicated in by solid lines and one-dot chain lines, respectively. Solid line A indicated in FIG. 8 represents an example of a drive-power-source switching boundary line which defines the motor-drive region and the engine-drive region. As is understood from FIG. 8, the hybrid control portion 84 establishes the motor-drive mode when the output torque Tour is in a comparatively low range in which the engine operating efficiency is comparatively low, namely, when the accelerator pedal operation amount $A_{CC}$ is in a comparatively small range, or when the output shaft speed $N_{OUT}$ is comparatively low, that is, when the vehicle load is comparatively low.

For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

Thus, the shifting boundary line map indicated in FIG. 8 by way of example is determined to establish the motor-drive mode when the output torque Tour or accelerator pedal operation amount $A_{CC}$ is in a comparatively low or small range in which the engine operating efficiency is comparatively low, namely, when the engine torque $T_E$ is in a comparatively low range, or when the output shaft speed $N_{OUT}$ is comparatively low, that is, when the vehicle load is comparatively low.

Figure 11:
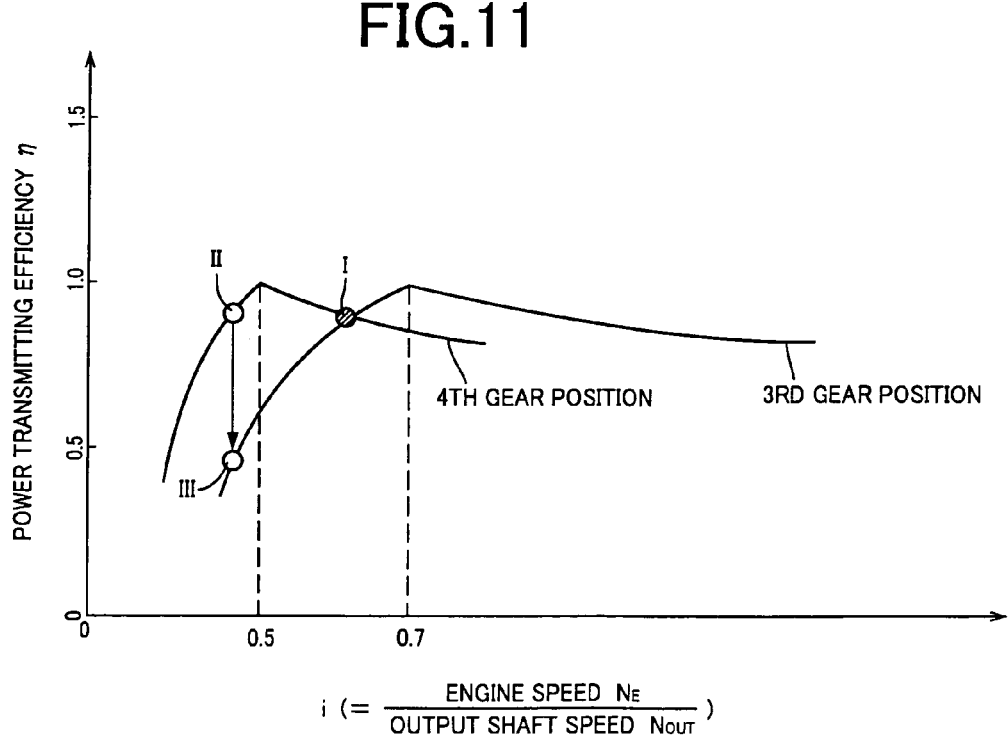
FIG. 11 is a view indicating relationships between a ratio of an engine speed to an output shaft speed and a power transmitting efficiency of the power transmitting system, for the third and fourth gear positions of the automatic transmission portion.

For maximizing the fuel economy of the hybrid vehicle, a shifting action of the automatic transmission portion 20 is desirably implemented when the overall power transmitting efficiency of the transmission mechanism 10 is optimum. Referring to a graph of FIG. 11, there are indicated relationships between a ratio "i" of the engine speed $N_E$ (rotating speed of the input shaft 14 of the transmission mechanism 10) to the rotating speed $N_{OUT}$ of the output shaft 22 (output shaft speed of the transmission mechanism 10), and a power transmitting efficiency η of the transmission mechanism 10, for the third and fourth gear positions of the automatic transmission portion 20. In the graph of FIG. 11, the above-indicated speed ratio "i" ($=N_E/N_{OUT}$) is taken along the horizontal axis, while the power transmitting efficiency η is taken along the vertical axis.

The power transmitting efficiency η is theoretically highest when a shifting action between the third and fourth gear positions of the automatic transmission portion 20 is implemented at a point I which is a point of intersection between a curve indicative of the above-indicated relationship for the third gear positions and a curve indicative of the relationship for the fourth gear position. If the shifting action between the third and fourth gear positions was implemented at a point other than the point I, the power transmitting efficiency η of the transmission mechanism 10 would be deteriorated before or after the shifting action. If a shift-down action of the automatic transmission portion 20 from the fourth gear position to the third gear position was implemented at a point II, the power transmitting efficiency η of the transmission mechanism 10 after the shift-down action would be deteriorated as represented by a point III, since the ratio "i" of the engine speed $N_E$ to the output shaft speed $N_{OUT}$ will not change during an extremely short time before and after the shifting action. Accordingly, the vehicle would be required to run in this state of low power transmitting efficiency η.

It is noted that the engine speed $N_E$ follows the accelerator pedal operation amount $A_{CC}$, and is therefore related to the accelerator pedal operation amount $A_{CC}$, while the output shaft speed $N_{OUT}$ corresponds to or is proportional to the vehicle speed V, that is, the vehicle speed V is determined by the output shaft speed $N_{OUT}$, the speed reduction ratio of the differential gear device 32 (final speed reduction gear) and the radius of the drive wheels 34. It is also noted that there are infinite combinations of the engine speed $N_E$ and the output shaft speed $N_{OUT}$, for the same value of the ratio "i" which is taken along the horizontal axis of the graph of FIG. 11. That is, there exist infinite combinations of the engine speed $N_E$ and the output shaft speed $N_{OUT}$, for the ratio "i" corresponding to the point I at which the power transmitting efficiency $\eta$ is theoretically highest. The values of the engine speed $N_E$ of the combinations in question are converted into respective values of the operation amount $A_{CC}$ of the accelerator pedal 116, to obtain infinite combinations of the operation amount $A_{CC}$ and the output shaft speed $N_{OUT}$. The thus obtained infinite combinations are represented by infinite points in the shifting boundary line map of FIG. 8, which collectively define a shifting boundary line (hereinafter referred to as "theoretically optimum shifting boundary line") for the theoretically highest power transmitting efficiency $\eta$, In the shifting boundary line map of FIG. 8, each shift-up boundary line indicated by the solid line is set to be close to the above-indicated theoretically optimum shifting boundary line, while each shift-down boundary line indicated by the broken line is set to be spaced from the shift-up boundary line in the leftward and upward directions as seen in FIG. 8, by distances enough to prevent busy shifting actions, that is, successive shift-up and shift-down actions, for instance, a shift-up action from the third gear position to the fourth gear position, and a shift-down action from the fourth gear position to the third gear position, which takes place immediately after the shift-up action.

Where the shifting boundary line map is defined by the output shaft speed $N_{OUT}$ and the accelerator pedal operation amount $A_{CC}$, as indicated in FIG. 8, the engine speed $N_E$ follows the accelerator pedal operation amount $N_{OUT}$ and is related to the accelerator pedal operation amount $A_{CC}$. Namely, the shifting boundary line map of FIG. 8 is defined on an assumption that the accelerator pedal operation amount $A_{CC}$ is convertible into the engine speed $N_E$. This assumption does not cause a problem while the vehicle is running in a steady state or while a rate of change of the operation amount $A_{CC}$ of the accelerator pedal 116 is relatively low. When the operation amount $A_{CC}$ of the accelerator pedal 116 is changed abruptly or at a relatively high rate, the above-indicated assumption does not actually exist. When the operation amount $A_{CC}$ is increased abruptly for rapid acceleration of the vehicle, a rise of the engine speed $N_E$ is delayed with respect to an increase of the accelerator pedal operation amount $A_{CC}$, so that the highest power transmitting efficiency $\eta$ is not obtained by the shifting actions of the automatic transmission portion 20 which are implemented on the basis of the accelerator pedal operation amount $A_{CC}$ used as a parameter indicative of the actual engine speed $N_E$ and according to the theoretically optimum shifting boundary lines.

As described above, the shifting actions of the automatic transmission portion 20 implemented on the basis of the accelerator pedal operation amount $A_{CC}$ not accurately representing the actual engine speed $N_E$ and according to the theoretically optimum shifting boundary lines may not assure the highest power transmitting efficiency $\eta$ of the transmission mechanism 10. When the accelerator pedal operation amount $A_{CC}$ is abruptly increased, for example, a shifting action of the automatic transmission portion between the third and fourth gear positions according to the theoretically optimum shifting line corresponding to the shifting point I for the highest power transmitting efficiency $\eta$ may not assure the highest power transmitting efficiency $\eta$ because the engine speed $N_E$ has not yet been raised to a value corresponding to the abruptly increased value of the accelerator pedal operation amount $A_{CC}$, at a point of time at which the shifting action is initiated. In other words, the shifting action is implemented at a point II indicated in FIG. 11, for instance. It is better to delay this shifting action according to the theoretically optimum shifting line, for maintaining the present gear position of the automatic transmission portion 20 and waiting for the rise of the engine speed $N_E$, for maximizing the power transmitting efficiency $\eta$ of the transmission mechanism 10.

Referring back to the functional block diagram of FIG. 7, the shifting-boundary-line changing portion 92 is configured to change the shifting boundary lines to shifting boundary lines that are determined by taking account of a delay of a change of the engine speed $N_E$ with respect to a change of the accelerator pedal operation amount $A_{CC}$, for assuring shifting actions of the automatic transmission portion 20 with the highest power transmitting efficiency $\eta$ even when the change of the engine speed $N_E$ is delayed with respect to the change of the accelerator pedal operation amount $A_{CC}$. Described in detail, the shifting-boundary-line changing portion 92 generates new shifting boundary lines (a new shifting boundary line map) on the basis of an amount of change of the accelerator pedal operation amount $A_{CC}$ detected by the accelerator operation-amount sensor 102, and the engine speed $N_E$. The shifting boundary lines stored in the step-variable shifting control portion 82 are replaced by the generated new shifting boundary lines, and the shifting-action determining portion 94 uses the new shifting boundary lines generated by the shifting-boundary-line changing portion 92.

Figure 12:
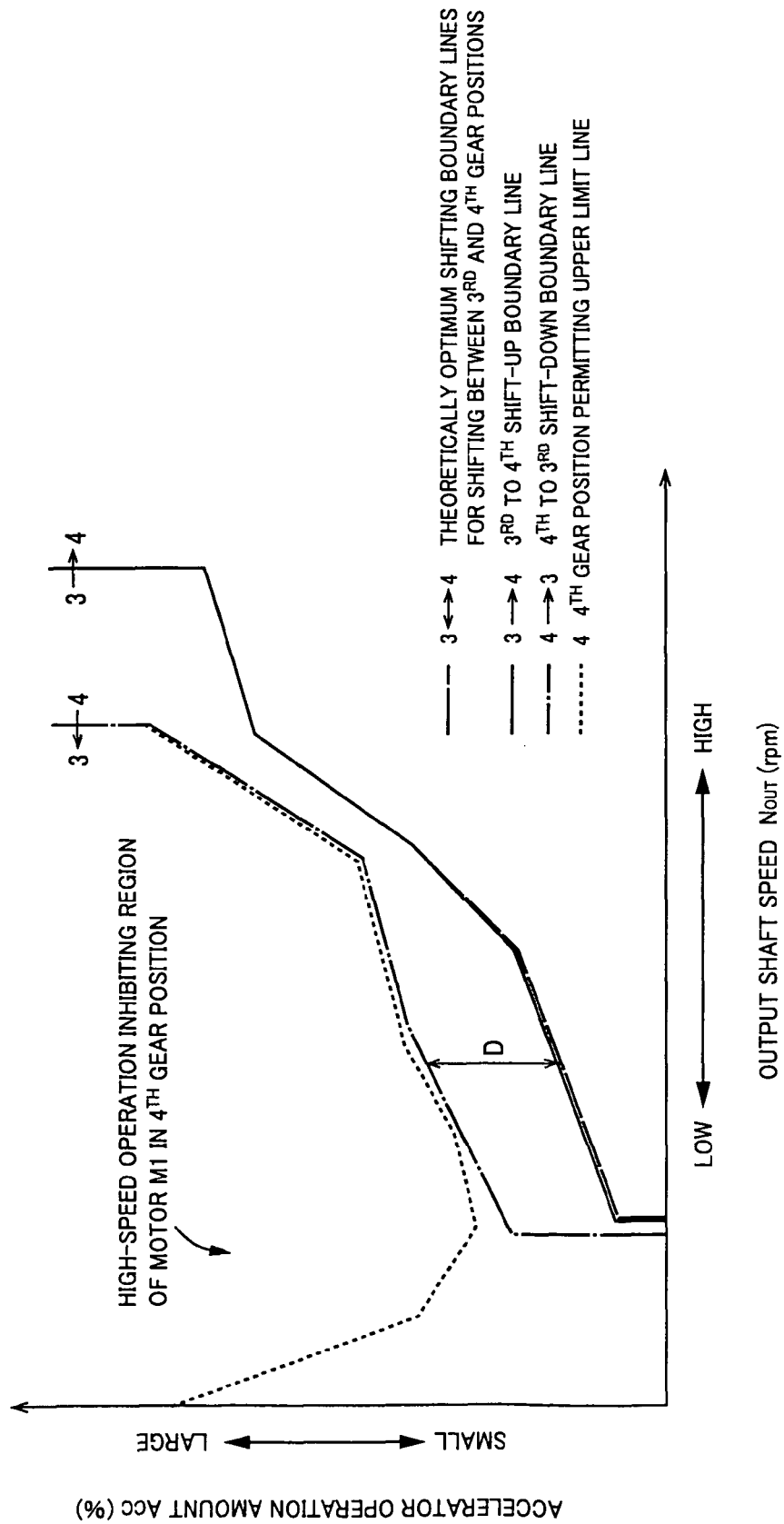
FIG. 12 is a view showing an example of new shifting boundary lines generated by the electronic control device of FIG. 4.

Referring to FIG. 12, there is indicated an example of new shifting boundary lines generated by the shifting-boundary-line changing portion 92, at a given rate of change $\Delta PAP$ of the accelerator pedal operation amount $A_{CC}$ and a given value of the engine speed $N_E$. The shifting-action determining portion 94 uses the new shifting boundary lines in place of the original shifting boundary lines of FIG. 8. In FIG. 12, a solid line indicates a new shift-up boundary line for the shift-up action of the automatic transmission portion 20 from the third gear position to the fourth gear position, and a one-dot chain line indicates a new shift-down boundary line for the shift-down action from the fourth gear position to the third gear position, while a broken line indicates the theoretically optimum shifting boundary line for the shift-up and shift-down actions between the third and fourth gear positions. A dashed line indicates an upper limit line of the vehicle running state below which the automatic transmission portion 20 is permitted to be placed in the fourth gear position. The upper limit line is determined by the specifications of the first electric motor M1. The vehicle is not permitted to run in a high-speed operation inhibiting region of the first electric motor M1 which is on the upper side (as seen in FIG. 12) of the upper limit line indicated by the dashed line and in which the first electric motor speed $N_{M1}$ is higher than a predetermined upper limit.

The new shift-up boundary line (indicated by the solid line in FIG. 12) generated by the shifting-boundary-line changing portion 92 is substantially identical with the theoretically optimum shifting boundary line (indicated by the broken line) for the shifting actions between the third and fourth gear positions, while the new shift-down boundary line (indicated by the one-dot chain line) is spaced upwards from the theoretically optimum shifting boundary line by a spacing amount or distance D, that is, spaced in the direction of increase of the accelerator pedal operation amount $A_{CC}$ from the theoretically optimum shifting boundary line.

The spacing amount or distance D as seen in the shifting boundary line map of FIG. 12 is represented by the following equation (1):

$$D = K_1 \times \Delta PAP - K_2 \times N_E \qquad (1)$$

ΔPAP represents the amount of change of the accelerator pedal operation amount $A_{CC}$ during a unit time, that is, a rate of change of the accelerator pedal operation amount $A_{CC}$, and $K_1$ and $K_2$ represent coefficients obtained by simulation or experimentation. The equation (1) is formulated by taking account of a fact that an amount of delay of a change of the engine speed $N_E$ with respect to a change of the accelerator pedal operation amount $A_{CC}$ increases with an increase of the rate of change ΔPAP of the accelerator pedal operation amount $A_{CC}$ and with a decrease of the engine speed $N_E$ during the change of the operation amount $A_{CC}$. The spacing amount or distance D obtained according to the above-indicated equation (1) reflects the amount of delay of the change of the engine speed $N_E$ with respect to the change of the accelerator pedal operation amount $A_{CC}$.

As described above, the theoretically optimum shifting boundary line indicated by the broken line in FIG. 12 is defined by a succession of points corresponding to the ratio "i" of the engine speed $N_E$ to the output shaft speed $N_{OUT}$. Therefore, the engine speed $N_E$ at the points lying on the theoretically optimum shifting boundary line is calculated on the basis of the ratio "i" and the output shaft speed $N_{OUT}$, according to the following equation (2):

$$N_E = i \times N_{OUT} \qquad (2)$$

Accordingly, the above-indicated equation (1) can be converted into the following equation (3):

$$D = K_1 \times \Delta PAP - K_2 \times i \times N_E \qquad (3)$$

The above-indicated equation (3) represents the spacing distance D of the shift-down boundary line from the theoretically optimum shifting boundary line, for each value of the output shaft speed $N_{OUT}$ at the rate of change ΔPAP of the accelerator pedal operation amount $A_{CC}$. That is, the shift-down boundary line is generated according to the above-indicated equation (3), for each value of the rate of change ΔPAP of the accelerator pedal operation amount $A_{CC}$. The spacing distance D by which the shift-down boundary line is spaced from the theoretically optimum shifting boundary line (shift-up boundary line) for the same vehicle speed V increases with an increase of the rate of change ΔPAP and with a decrease of the engine speed $N_E$ or output shaft speed $N_{OUT}$. That is, the values of the accelerator pedal operation amount $A_{CC}$ lying on the new shift-down boundary line indicated by the one-dot chain line are larger than those lying on the theoretically optimum shifting boundary line indicated by the broken line (shift-up boundary line indicated by the solid line).

The coefficients $K_1$ and $K_2$ are determined such that the shift-down boundary line determined according to the above-indicated equation (1) or (3) does not go into the high-speed operation inhibiting region of the first electric motor M1 defined by the upper limit line of the vehicle running state indicated by the dashed line, that is, such that the shift-down boundary line is not located above the upper limit line. In other words, the coefficients $K_1$ and $K_2$ are determined so as to prevent an excessive rise of the rotating speed $N_{M1}$ of the first electric motor M1 in the operating state of the power transmitting system (hybrid vehicle) represented by any point lying on the new shift-down boundary line generated by the shifting-boundary-line changing portion 92.

The shift-up and shift-down boundary lines indicated in FIG. 12 are examples of the new shifting boundary lines generated by the shifting-boundary-line changing portion 92, at a given value of the rate of change ΔPAP of the accelerator pedal operation amount $A_{CC}$. The shifting-boundary-line changing portion 92 is configured to generate the new shift-up and shift-down boundary lines for each of different values of the rate of change ΔPAP.

The control apparatus in the form of the electronic control device 80 is arranged to execute a control routine illustrated in the flow chart of FIG. 13 by way of example. The control routine is initiated with steps S1 and S2 corresponding to the shifting-action determining portion 94, to detect the vehicle speed V and the accelerator pedal operation amount $A_{CC}$, respectively. The vehicle speed V is detected by the vehicle speed sensor 112, while the accelerator pedal operation amount $A_{CC}$ is detected by the accelerator operation-amount sensor 102.

Then, the control flow goes to steps S3-S6 corresponding to the shifting-boundary-line changing portion 92. In step S3, the engine speed $N_E$ is detected on the basis of the output signal of the engine speed sensor 104. In step S4, the rate of change (amount of change per unit time) ΔPAP of the operation amount $A_{CC}$ of the accelerator pedal 116 is calculated. The rate of change ΔPAP can be calculated on the basis of a cycle time of the present control routine, and a difference between the operation amount $A_{CC}$ detected in step S2 of the present cycle of execution of the control routine, and the operation amount $A_{CC}$ detected in step S2 of the preceding cycle. Alternatively, the rate of change ΔPAP can be calculated on the basis of a difference between the operation amount $A_{CC}$ detected in step S2 of the present cycle of execution of the control routine, and the operation amount $A_{CC}$ detected a predetermined length of time prior to the moment of implementation of step S4, and on the basis of that predetermined length of time.

Step S5 is provided to determine whether the shifting boundary lines should be changed. This determination is made on the basis of the engine speed $N_E$ detected in step S3 and the rate of change ΔPAP of the accelerator pedal operation amount $A_{CC}$ detected in step S4. As described above, the shifting boundary lines should be changed for assuring the high power transmitting efficiency η of the transmission mechanism 10, when a change of the engine speed $N_E$ is delayed with respect to a change of the operation amount $A_{CC}$ of the accelerator pedal 116, in the event of an abrupt increase of the operation amount $A_{CC}$, for example. When the above-indicated delay does not take place, on the other hand, the shifting actions of the automatic transmission portion 20 are implemented according to the original shifting boundary lines of FIG. 8. Described more specifically, an affirmative determination is obtained in step S5 when the detected rate of change ΔPAP is higher than a predetermined upper limit $ΔPAP_0$. If the affirmative determination is obtained in step S5, the control flow goes to step S6 in which the new shifting boundary lines are generated on the basis of the engine speed $N_E$ detected in step S3 and the rate of change ΔPAP calculated in step S4, and the original shifting boundary lines are replaced by the generated new shifting boundary lines. Step S6 is followed by step S7. If a negative determination is obtained in step S5, the control flow goes to step S7 while skipping step S6.

In step S7 corresponding to the shifting-action determining portion 94, a determination as to whether the automatic transmission portion 20 should be shifted is made on the basis of the vehicle speed V1 and accelerator pedal operation amount $A_{CC}$ detected in steps S1 and S2, respectively, and according to the shifting boundary lines (shift-up and shift-down boundary lines). If the new shifting boundary lines as indicated in FIG. 12 are generated in step S6 by the shifting-boundary-line changing portion 92, the determination by the shifting-action determining portion 94 is made according to the new shifting boundary lines. If the negative determination is obtained in step S5, the determination is made according to the original shifting boundary lines of FIG. 8 stored in the step-variable shifting control portion 82. If an affirmative determination is obtained in step S7, the control flow goes to step S8 corresponding to the shifting-action implementing portion 96. If a negative determination is obtained in step S7, one cycle of execution of the present control routine is terminated.

In step S8 corresponding to the shifting-action implementing portion 96, a shift-up or shift-down action of the automatic transmission portion 20 determined in step S7 is implemented to establish the appropriate gear position by engaging and releasing the relevant two frictional coupling devices according to the table of FIG. 2, while the hydraulic pressures $P_{SL}$ of the engaged and released coupling devices are controlled with the commanded value of the hydraulic pressures $P_{SL}$ being changed as indicated in the time chart of FIG. 9, for example.

According to the control apparatus in the form of the electronic control device 80 constructed according to the illustrated embodiment of the invention, the shifting point at which the speed ratio γ or gear position of the automatic transmission portion 20 is changed is set by the shifting-boundary-line changing portion 92 (step S6) of the step-variable shifting control portion 82, on the basis of a delay of a response of a change of the operating speed $N_E$ of the engine 8 to a change of the required vehicle drive force in the form of the operation amount $A_{CC}$ of the accelerator pedal 112, so that shifting actions of the automatic transmission portion 20 are adequately implemented even for a transient period during which the actual engine speed $N_E$ is changed to a target value corresponding to the changed operation amount $A_{CC}$ of the accelerator pedal 112. Accordingly, the control apparatus effectively reduces a risk of reduction of the power transmitting efficiency η of the power transmitting system in the form of the transmission mechanism 10 during the shifting actions of the automatic transmission portion 20.

The control apparatus according to the illustrated embodiment of the invention is further arranged such that the switching point at which the operating mode which determines the operating state of the vehicular power transmitting system in the form of the transmission mechanism 10 is set by the shifting-boundary-line changing portion 92 (step S6), on the basis of the response delay of the change of the operating speed $N_E$ of the engine 8 to the change of the required vehicle drive force in the form of the operation amount $A_{CC}$ of the accelerator pedal 112, so that the operating mode of the vehicular power transmitting system is adequately switched even for a transient period during which the actual engine speed $N_E$ is changed to a target value corresponding to the changed required vehicle drive force. Accordingly, the present control apparatus effectively reduces a risk of reduction of the power transmitting efficiency η of the vehicular power transmitting system during switching of the operating mode.

The electronic control device 80 according to the illustrated embodiment is further configured such that each shift-down boundary line generated by the shifting-boundary-line changing portion 92 (step S6) is a succession of shift-down points at which the automatic transmission portion 20 is shifted down, so that a shift-down action so-called "kick-down" of the automatic transmission portion 20 is adequately implemented even for the transient period during which the actual engine speed $N_E$ is changed to the target value corresponding to a rapidly changed value of the required vehicle drive force in the form of the operation amount $A_{CC}$ of the accelerator pedal 116, as a result of abrupt depression of the accelerator pedal 116, for example. Accordingly, the present control apparatus permits effective reduction of the risk of reduction of the power transmitting efficiency η of the vehicular power transmitting system in the form of the transmission mechanism 10 during the shift-down actions of the automatic transmission portion 20.

The electronic control device 80 is also arranged such that each shift-down boundary line generated by the shifting-boundary-line changing portion 92 (step S6) is a succession of switching points at which the operating mode is changed from a mode suitable for a high-speed running of the hybrid vehicle to a mode suitable for low-speed running of the hybrid vehicle. Accordingly, a change of the operating mode so-called "kick-down" of the vehicular power transmitting system in the form of the transmission mechanism 10 is adequately implemented even for the transient period during which the actual engine speed $N_E$ is changed to the target value corresponding to a rapidly changed value of the required vehicle drive force in the form of the operation amount $A_{CC}$ of the accelerator pedal 116, as a result of abrupt depression of the accelerator pedal 116, for example. Accordingly, the present control apparatus permits effective reduction of the risk of reduction of the power transmitting efficiency η of the vehicular power transmitting system during switching of the operating mode.

The electronic control device 80 is further configured such that each shift-down boundary line generated by the shifting-boundary-line changing portion 92 (step S6) is a succession of shift-down points located on the lower side of the dashed line in FIG. 12, which defines the high-speed operation inhibiting region of the first electric motor M1 and which represents the predetermined upper limit of the operating speed $N_{M1}$ of the first electric motor M1. Accordingly, the automatic transmission portion 20 is shifted down so as to prevent a rise of the operating speed $N_{M1}$ of the first electric motor M1 beyond the predetermined upper limit.

The electronic control device 80 is further configured such that each shift-down boundary line generated by the shifting-boundary-line changing portion 92 (step S6) is a succession of switching points of the operating mode of the transmission mechanism 10, which are located on the lower side of the dashed line in FIG. 12, which defines the high-speed operation inhibiting region of the first electric motor M1 and which represents the predetermined upper limit of the operating speed $N_{M1}$ of the first electric motor M1. Accordingly, the operating mode of the transmission mechanism 10 is changed or switched so as to prevent a rise of the operating speed $N_{M1}$ of the first electric motor M1 beyond the predetermined upper limit.

The electronic control device 80 is further arranged such that the shifting-boundary-line changing portion 92 (step S6) generates each new shifting boundary line, that is, a succession of shifting points such that the value of the required vehicle drive force in the form of the operation amount $A_{CC}$ of the accelerator pedal 116 at which the automatic transmission portion 20 is shifted at a given value of the running speed V of the hybrid vehicle increases with an increase of the amount of change ΔPAP per unit time of the operation amount $A_{CC}$. Thus, the shifting points of the automatic transmission portion 20 are set by taking account of the response delay of the change of the engine speed $N_E$ to the change of the accelerator pedal operation amount $A_{CC}$, which response delay is increased as the amount of change ΔPAP of the operation amount $A_{CC}$ is increased. Accordingly, the risk of reduction of the power transmitting efficiency η of the transmission mechanism 10 is effectively reduced even when the amount of change ΔPAP of the operation amount $A_{CC}$ is relatively large.

The electronic control device 80 is further arranged such that the shifting-boundary-line changing portion 92 (step S6) generates each new switching boundary line, that is, a succession of switching points of the operating mode of the transmission mechanism 10 such that the value of the required vehicle drive force in the form of the operation amount $A_{CC}$ of the accelerator pedal 116 at which the operating mode is switched or changed at a given value of the running speed V of the hybrid vehicle increases with an increase of the amount of change ΔPAP per unit time of the operation amount $A_{CC}$. Thus, the switching points of the operating mode of the vehicular power transmitting system are set by taking account of the response delay of the change of the engine speed to the change of the required vehicle drive force, which response delay is increased as the rate of change of the required vehicle drive force is increased. Accordingly, the risk of reduction of the power transmitting efficiency of the vehicular power transmitting system is effectively reduced even when the rate of change of the required vehicle drive force is relatively large.

The electronic control device 80 is further arranged such that the shifting-boundary-line changing portion 92 (step S6) generates each new shifting boundary line, that is, a succession of shifting points such that the value of the required vehicle drive force in the form of the operation amount $A_{CC}$ of the accelerator pedal 116 at which the automatic transmission portion 20 is shifted at a given value of the running speed V of the hybrid vehicle increases with a decrease of the operating speed $N_E$ of the engine 8. Thus, the shifting points of the automatic transmission portion 20 are set by taking account of the response delay of the change of the engine speed $N_E$ to the change of the accelerator pedal operation amount $A_{CC}$, which response delay is increased as the engine speed $N_E$ is lowered. Accordingly, the risk of reduction of the power transmitting efficiency η of the transmission mechanism 10 is effectively reduced even when the engine speed $N_E$ is relatively low.

The electronic control device 80 is further arranged such that the shifting-boundary-line changing portion 92 (step S6) generates each new switching boundary line, that is, a succession of switching points of the operating mode of the transmission mechanism 10 such that the value of the required vehicle drive force in the form of the operation amount $A_{CC}$ of the accelerator pedal 116 at which the operating mode is switched or changed at a given value of the running speed V of the hybrid vehicle increases with a decrease of the operating speed $N_E$ of the engine 8. Thus, the switching points of the operating mode of the vehicular power transmitting system are set by taking account of the response delay of the change of the engine speed to the change of the required vehicle drive force, which response delay is increased as the engine speed $N_E$ is lowered. Accordingly, the risk of reduction of the power transmitting efficiency of the vehicular power transmitting system is effectively reduced even when the engine speed $N_E$ is relatively low.

The electronic control device 80 is further arranged such that the shifting-boundary-line changing portion 92 (step S6) generates each new shifting boundary line, that is, a succession of shifting points such that the value of the required vehicle drive force in the form of the operation amount $A_{CC}$ of the accelerator pedal 116 at which the automatic transmission portion 20 is shifted at a given value of the running speed V of the hybrid vehicle increases with a decrease of the output shaft speed $N_{OUT}$ of the transmission mechanism 10. Thus, the shifting points of the automatic transmission portion 20 are set by taking account of the response delay of the change of the engine speed $N_E$ to the change of the accelerator pedal operation amount $A_{CC}$, which response delay is increased as the output shaft speed $N_{OUT}$ is lowered. Accordingly, the risk of reduction of the power transmitting efficiency η of the transmission mechanism 10 is effectively reduced even when the output shaft speed $N_{OUT}$ of the transmission mechanism 10 is relatively low.

The electronic control device 80 is further arranged such that the shifting-boundary-line changing portion 92 (step S6) generates each new switching boundary line, that is, a succession of switching points of the operating mode of the transmission mechanism 10 such that the value of the required vehicle drive force in the form of the operation amount $A_{CC}$ of the accelerator pedal 116 at which the operating mode is switched or changed at a given value of the running speed V of the hybrid vehicle increases with a decrease of the output shaft speed $N_{OUT}$ of the transmission mechanism 10. Thus, the switching points of the operating mode of the vehicular power transmitting system are set by taking account of the response delay of the change of the engine speed to the change of the required vehicle drive force, which response delay is increased as the output shaft speed $N_{OUT}$ is lowered. Accordingly, the risk of reduction of the power transmitting efficiency of the vehicular power transmitting system is effectively reduced even when the output shaft speed $N_{OUT}$ of the transmission mechanism 10 is relatively low.

In the illustrated transmission mechanism 10, the differential portion 11 is operable as a continuously-variable transmission portion while the operating states of the first and second electric motors M1, M2 are controlled, so that the differential portion 11 and the automatic transmission portion 20 cooperate to constitute a continuously variable transmission, which is operable to smoothly change the vehicle drive torque. The electrically controlled differential portion 11 is operable as a step-variable transmission portion the speed ratio of which is variable in steps, as well as an electrically controlled continuously-variable transmission portion the speed ratio of which is continuously variable.

In the vehicular power transmitting system in the form of the transmission mechanism 10, the automatic transmission portion 20 is disposed between the differential portion 11 and the output shaft 22 of the transmission mechanism 10, such that the differential potion 11 and the automatic transmission portion 20 are disposed in series with each other, so that the transmission mechanism 10 is made compact in construction.

While the preferred embodiment of this invention has been described in detail by reference to the accompanying drawings, it is to be understood that the present invention may be otherwise embodied.

While the vehicular power transmitting system in the form of the illustrated transmission mechanism 10 has only one input shaft 14, the power transmitting system controlled by the control apparatus of the present invention may include a plurality of shafts which are selectively enabled to function as an input shaft or concurrently enabled to function as input shafts, by controlling frictional coupling devices.

In the illustrated embodiment, the transmission mechanism 10 serving as the vehicular power transmitting system has the selectable operating states or modes which correspond to the different positions of the automatic transmission portion 20, that is, the forward-drive gear positions, the reverse-drive position R, and the power cut-off positions in the form of the neutral position N and parking position P. Further, the switching points of the operating modes of the transmission mechanism 10 are shifting points defined by the shifting boundary lines. However, the operating modes of the transmission mechanism 10 may consist of two operating modes, namely, a first mode in which the differential portion 11 is operable as a continuously-variable transmission portion the speed ratio of which is continuously variable, and a second mode in which the speed ratio of the differential portion 11 is held constant at a predetermined value. Further, the operating modes may consist of a plurality of modes corresponding to different operating states of the vehicle drive power sources in the form of the engine 8, first electric motor M1 and second electric motor M2. For instance, the operating modes consist of a first mode in which only the engine 8 is used as the vehicle drive power source, a second mode in which the engine 8 and the second electric motor M2 are used as the vehicle drive power sources, and a third mode in which only the second electric motor M2 is used as the vehicle drive power source.

In the illustrated embodiment, the control routine illustrated in the flow chart of FIG. 13 is executed by the electronic control device 80 operable as the control apparatus for the vehicular power transmitting system. However, the order in which the steps of the control routine are implemented may be determined or changed as desired. For instance, the step S1 of detecting the vehicle speed V may be implemented at any point of time prior to a point at which the step S7 is implemented.

In the illustrated embodiment, the shifting-boundary-line changing portion 92 is configured to calculate the spacing distance or amount D of the shift-down boundary line from the theoretically optimum shifting boundary line, according to the equation (1). However, the shifting-boundary-line changing portion 92 may use any other equation to calculate the spacing distance D.

In the illustrated embodiment, the shifting-boundary-line portion 92 generates the new shifting boundary lines on the basis of the detected amount of change ΔPAP of the operation amount $A_{CC}$ of the accelerator pedal 116 and the detected engine speed $N_E$, and according to the above-indicated equation (1). However, the shifting-boundary-line changing portion 92 may be configured to select an appropriate one of a multiplicity of non-original shifting boundary lines (different from the original shifting boundary lines of FIG. 8) which are stored in a memory and which correspond to respective different combinations of the amount of change ΔPAP of the accelerator pedal operation amount $A_{CC}$ and the engine speed $N_E$. In this case, the appropriate one of the non-original shifting boundary lines is selected on the basis of the detected amount of change ΔPAP and engine speed $N_E$. The non-original shifting boundary lines may be stored in the memory, in the form of a shifting boundary line map.

Although the shifting-boundary-line changing portion 92 (step S4) uses the amount of change ΔPAP per unit time of the accelerator pedal operation amount $A_{CC}$ as the rate of change of the accelerator pedal operation amount $A_{CC}$, the shifting-boundary-line changing portion 92 may use an amount of an instantaneous depressing operation of the accelerator pedal 116.

In the illustrated embodiment, the coefficients $K_1$ and $K_2$ included in the above-indicated equation (1) for calculating the spacing distance or amount D of the shift-down boundary lines from the theoretically optimum shifting boundary lines are determined such that the shifting points lying on the shift-down boundary line defined by the spacing distance D are not located in the high-speed operation inhibiting region of the first electric motor M1 defined by the upper limit line indicated by the dashed line in FIG. 12. However, the coefficients $K_1$ and $K_2$ included in the equation (1) may be determined without taking account of the high-speed operation inhibiting region of the first electric motor M1. If some shifting points lying on the shift-down boundary line generated according to the equation (1) including the thus determined coefficients $K_1$ and $K_2$ are located within the high-speed operation inhibiting region of the first electric motor M1, the shift-down boundary line is compensated to prevent a rise of the operating speed of the first electric motor M1 beyond the upper limit line.

In step S5 of the control routine in the illustrated embodiment, the determination as to whether the new shifting boundary line is required to be generated by the shifting-boundary-line changing portion 92 is made on the basis of the engine speed $N_E$ and the amount of change ΔPAP of the accelerator operation amount $A_{CC}$. However, this step S5 is not essential. Namely, the shift-down boundary line may be always generated according to the equation (1) in step S6.

Although the operation amount $A_{CC}$ of the accelerator pedal 116 is used as a parameter indicative of the required vehicle drive force in the illustrated embodiment, any other parameter which changes with the accelerator pedal operation amount $A_{CC}$ may be used as the parameter indicative of the required vehicle drive force. For instance, the accelerator pedal operation amount $A_{CC}$ may be replaced by an angle of opening of the electronic throttle valve 62 or an intake air quantity of the engine 8.

In the illustrated transmission mechanism 10, the differential portion 11 is operable as a continuously variable transmission. However, the differential portion 11 may be replaced by a step-variable transmission having a plurality of fixed speed ratios one of which is selectively established.

In the vehicular transmitting system in the form of the illustrated transmission mechanism 10, the vehicle drive power source in the form of the engine 8, the differential portion 11 and the automatic transmission portion 20 are connected in series with each other in this order of description so that an output of the engine 8 is transmitted to the automatic transmission portion 20 through the differential portion 11. However, the engine 8, automatic transmission portion 20 and differential portion 11 are disposed in this order of description so that the output of the engine 8 is transmitted to the differential portion 11 through the automatic transmission portion 20.

In the illustrated transmission mechanism 10 serving as the vehicular power transmitting system, the differential portion 11 and the automatic transmission portion 20 are connected in series to each other through the power transmitting member 18. However, the control apparatus according to the present invention is equally applicable to a vehicular power transmitting system in which an electrically controlled differential portion and a step-variable transmission portion are not mechanically independent of each other, provided the power transmitting system as a whole has an electric differential function, and a shifting function different from the electric differential function.

For example, the control apparatus of the present invention is applicable to a vehicular power transmitting system which includes two planetary gear sets connected to each other and in which an internal combustion engine, an electric motor and drive wheels are operatively connected to respective rotary elements of the planetary gear sets, such that the power transmitting system is switchable between a step-variable shifting state and a continuously-variable shifting state, by controlling clutches and brakes connected to respective rotary elements of the planetary gear sets.

While the illustrated transmission mechanism 10 uses the single-pinion type planetary gear sets, the transmission mechanism may use double-pinion type planetary gear sets.

What is claimed is:

1. A control apparatus for a vehicular power transmitting system including (a) an electrically controlled differential portion which has a differential mechanism and an electric motor operatively connected to a rotary element of the differential mechanism and which is operable to control a differential state between a rotating speed of its input shaft connected to an engine and a rotating speed of its output shaft by controlling an operating state of the electric motor, and (b) a transmission portion which constitutes a part of a power transmitting path and which functions as an automatic transmission portion, the control apparatus comprising:

a shifting control portion configured to set a shifting point of the transmission portion, on the basis of a delay of a response of a change of an operating speed of the engine to a change of a required vehicle drive force to be transmitted through the vehicular power transmitting system.

2. The control apparatus according to claim 1, wherein the shifting point is a shift-down point at which the transmission portion is shifted down.

3. The control apparatus according to claim 1, wherein the shifting control portion sets the shifting point of the transmission portion such that an operating speed of the electric motor does not exceed a predetermined upper limit.

4. The control apparatus according to claim 1, wherein the shifting control portion sets the shifting point of the transmission portion such that a value of the required vehicle drive force at which the transmission portion is shifted at a given running speed of a vehicle provided with the vehicular power transmitting system increases with an increase of a rate of change of the required vehicle drive force.

5. The control apparatus according to claim 1, wherein the shifting control portion sets the shifting point of the transmission portion such that a value of the required vehicle drive force at which the transmission portion is shifted at a given running speed of a vehicle provided with the vehicular power transmitting system increases with a decrease of an operating speed of the engine.

6. The control apparatus according to claim 1, wherein the shifting control portion sets the shifting point of the transmission portion such that a value of the required vehicle drive force at which the transmission portion is shifted at a given running speed of a vehicle provided with the vehicular power transmitting system increases with a decrease of an output shaft speed of the vehicular power transmitting system.

7. The control apparatus according to claim 1, wherein the electrically controlled differential portion functions as a continuously-variable transmission portion while the operating state of the electric motor is controlled.

8. The control apparatus according to claim 1, wherein the transmission portion is disposed between the electrically controlled differential portion and an output shaft of the vehicular power transmission system.

9. The control apparatus according to claim 1, wherein the required vehicle drive force is an operation amount of a vehicle accelerating member operable to accelerate a vehicle provided with the vehicular power transmitting system.

10. The control apparatus according to claim 1, wherein the shifting point of the transmission portion is defined by the required vehicle drive force and a running speed of a vehicle provided with the vehicular power transmitting system.

11. The control apparatus according to claim 1, wherein the shifting control portion sets the shifting point of the transmission portion by moving a basic shifting point.

12. The control apparatus according to claim 11, wherein the basic shifting point lies on a theoretically optimum shifting boundary line which assures a theoretically highest power transmitting efficiency of the vehicular power transmitting system.

13. A control apparatus for a vehicular power transmitting system including (a) an electrically controlled differential portion which has a differential mechanism operatively connected to an engine and an electric motor operatively connected to a rotary element of the differential mechanism and a differential state of which is controllable by controlling an operating state of the electric motor, and (b) a transmission portion which constitutes a part of a power transmitting path and which functions as a step-variable automatic transmission portion, the control apparatus comprising:

a shifting control portion configured to set a switching point of an operating mode of the vehicular power transmitting system, on the basis of a delay of a response of a change of an operating speed of the engine to a change of a required vehicle drive force to be transmitted through the vehicular power transmitting system.

14. The control apparatus according to claim 13, wherein the switching point is a shift-down switching point at which the vehicular power transmitting system is shifted down.

15. The control apparatus according to claim 13, wherein the shifting control portion sets the switching point of the operating mode of the vehicular power transmitting system such that an operating speed of the electric motor does not exceed a predetermined upper limit.

16. The control apparatus according to claim 13, wherein the shifting control portion sets the switching point of the operating mode of the vehicular power transmitting system such that a value of the required vehicle drive force at which the operating mode is switched at a given running speed of a vehicle provided with the vehicular power transmitting system increases with an increase of a rate of change of the required vehicle drive force.

17. The control apparatus according to claim 13, wherein the shifting control portion sets the switching point of the operating mode of the vehicular power transmitting system such that a value of the required vehicle drive force at which the operating mode is switched at a given running speed of a vehicle provided with the vehicular power transmitting system increases with a decrease of an operating speed of the engine.

18. The control apparatus according to claim 13, wherein the shifting control portion sets the switching point of the operating mode of the vehicular power transmitting system such that a value of the required vehicle drive force at which the operating mode is switched at a given running speed of a vehicle provided with the vehicular power transmitting system increases with a decrease of an output shaft speed of the vehicular power transmitting system.

19. The control apparatus according to claim 13, wherein the electrically controlled differential portion functions as a continuously-variable transmission portion while the operating state of the electric motor is controlled.

20. The control apparatus according to claim 13, wherein the transmission portion is disposed between the electrically controlled differential portion and an output shaft of the vehicular power transmission system.

21. The control apparatus according to claim 13, wherein the required vehicle drive force is an operation amount of a vehicle accelerating member operable to accelerate a vehicle provided with the vehicular power transmitting system.

22. The control apparatus according to claim 13, wherein the switching point of the operating mode of the vehicular power transmitting system is defined by the required vehicle drive force and a running speed of a vehicle provided with the vehicular power transmitting system.

23. The control apparatus according to claim 13, wherein the shifting control portion sets the switching point of the operating mode of the vehicular power transmitting system by moving a basic switching point.

24. The control apparatus according to claim 23, wherein the basic switching point lies on a theoretically optimum switching boundary line which assures a theoretically highest power transmitting efficiency of the vehicular power transmitting system.

* * * * *